(12) United States Patent
Oguchi

(10) Patent No.: US 7,364,076 B2
(45) Date of Patent: Apr. 29, 2008

(54) CARD READER

(75) Inventor: Koji Oguchi, Nagano (JP)

(73) Assignee: Nidec Sankyo Corporation, Nagano (JP)

( * ) Notice: Subject to any disclaimer, the term of this patent is extended or adjusted under 35 U.S.C. 154(b) by 270 days.

(21) Appl. No.: 11/258,618

(22) Filed: Oct. 24, 2005

(65) Prior Publication Data

US 2006/0086793 A1 Apr. 27, 2006

Related U.S. Application Data

(63) Continuation-in-part of application No. 11/014,189, filed on Dec. 16, 2004, now Pat. No. 7,175,085.

(30) Foreign Application Priority Data

| Oct. 25, 2004 | (JP) | ............................. 2004-309458 |
| Jul. 14, 2005 | (JP) | ............................. 2005-206020 |
| Jul. 14, 2005 | (JP) | ............................. 2005-206041 |

(51) Int. Cl.
*G06K 7/06* (2006.01)

(52) U.S. Cl. ...................... 235/441; 235/380; 235/475; 235/479

(58) Field of Classification Search ................ 235/441, 235/479, 475, 486
See application file for complete search history.

(56) References Cited

U.S. PATENT DOCUMENTS 5,646,392 A * 7/1997 Oguchi ....................... 235/475
6,824,062 B2 * 11/2004 Hirasawa .................... 235/479

FOREIGN PATENT DOCUMENTS

| JP | 2001-222686 | 8/2001 |
| JP | 2005-056376 | 3/2005 |

* cited by examiner

*Primary Examiner*—Seung Ho Lee
(74) *Attorney, Agent, or Firm*—Hogan & Hartson LLP

(57) ABSTRACT

A card reader is provided with a card locking device preventing a card shaped medium from pulling out for illegal taking-out The card locking device includes a lock member which is turnably supported and provided with an engaging part so as to abut with the surface of the card shaped medium and a movable member which is connected to the lock member and is reciprocally movable in a direction to the card insertion port. The movable member turns the lock member around the support shaft pin such that the engaging part abuts with the card shaped medium to lock the card shaped medium. The engaging part may be constructed by a plurality of plate members whose thicknesses are different is laminated in a width direction of the card shaped medium.

14 Claims, 13 Drawing Sheets

CARD READER

This application is a continuation-in-part application of application Ser. No. 11/014,189, filed Dec. 16, 2004 now U.S. Pat. No. 7,174,085, which application is hereby incorporated by reference in its entirety.

BACKGROUND OF THE INVENTION

1. Field of the Invention

The present invention relates to a card reader, which reads information from a card shaped recording medium, hereinafter, referred to as a card shaped medium, provided with an information recording part or information recording means, such as a magnetic stripe or an IC chip. More specifically, the present invention relates to a card reader provided with a function that prevents a card shaped medium from being stolen with fraudulent conduct by a malicious person, such as a criminal.

2. Description of Related Art

A card reader that is equipped in an ATM device (Automated-Teller Machine) or a vending machine is a device that commonly performs reading and writing of information from and on a card shaped medium inserted from a card insertion port. In such a conventional card reader, a protection shutter is provided at an inner side of the card insertion port to prevent a foreign object other than the card shaped medium from being inserted from the card insertion port or to prevent the card shaped medium from being taken out and stolen with fraudulent conduct by a malicious person, such as a criminal. The protection shutter is moved to open when a medium detection sensor detects a card shaped medium, which is inserted from the card insertion port, and moved to close when the card shaped medium has detected that the medium has been taken into the inside of the device from the card insertion port. Fraudulent conduct by a criminal may be conceived as follows. For example, immediately after a customer inserts a card shaped medium into a card insertion port, a failure may occur in mechanical components or in an electric system inside of the device to cause the card shaped medium to be jammed and/or abnormally stopped. Alternatively, a criminal may intentionally conduct a malicious act to cause the card shaped medium to be compulsively stopped. In these cases, when the customer departs from the place to call a person in charge under the state where the protection shutter is opened, the criminal can take out the card shaped medium at that time.

In order to prevent such a fraudulent theft of a card shaped medium, some prior attempts have been proposed. For example, one attempt is that a card shaped medium, which is abnormally stopped, is locked by a member whose tip end is sharp and is stuck into its card face at the abnormally stopped position so as not to be illegally pulled out. (See, for example, Japanese Patent Laid-Open No. 2001-222686). Further, another attempt for preventing a fraudulent theft of a card shaped medium has been known in which the illegal taking-out of the card shaped medium by a criminal is prevented by pressing a pawl of a ratchet structure on the surface of the card shaped medium.

In addition, another attempt has been known in which an eccentric cam is used to prevent the illegal taking-out of a card shaped medium. In this attempt, the eccentric cam provided at a card insertion port is rotated around a rotation shaft as a center and the outer peripheral face of the eccentric cam comes into contact with the surface of the card shaped medium. The outer peripheral face of the eccentric cam with a prescribed thickness is formed in a saw tooth shape, and the taking-out of the card shaped medium from the card insertion port is prevented by a frictional force when the outer peripheral face is brought into contact with the card shaped medium. In addition, when the card shaped medium is going to be taken out from the card insertion port, the eccentric cam turns by a frictional force between the card shaped medium and the eccentric cam, and the outer peripheral face is tightly brought into contact with the card shaped medium to prevent the taking-out of the card shaped medium. (See, for example, Japanese Patent Laid-Open No. 2005-56376).

However, in the card reader described in the former attempt, further improvement is required. In the former attempt, a sharp-pointed member is stuck into the card shaped medium. Therefore, an improvement is required to cope with the situation even when a criminal tries to take out the card shaped medium with a pulling-out force stronger than the locking force by the sharp-pointed member to thereby the card shaped medium at the stopped position. Further, the card locking device described in the former attempt is required to be disposed near the card insertion port, and its disposing space causes the size of the card reader to be larger.

Further, in the card reader described in the latter attempt, since the eccentric cam made of one piece of plate is used, the card may be torn to be carried away when the card is forcibly taken out. In particular, a card shaped medium of recent years may be structured as a composite type in which a magnetic stripe and an IC chip are mounted. Thus, even when one of the magnetic stripe and the IC chip is damaged, the other information may be read.

In addition, in the card reader described in the former attempt in which a locking pawl is engaged with the surface of the card shaped medium to prevent illegal taking-out of the card shaped medium, a locking force by the locking pawl is effectively applied when a criminal applies force to the card shaped medium in its taking-out direction. Similarly, in the card reader described in the latter attempt, the eccentric cam is tightly brought into contact with the card shaped medium to prevent illegal taking-out of the card shaped medium. However, in the above-mentioned card readers, when a criminal applies a force that pushes the card shaped medium in the reverse direction and obstinately tries to repeat pushing and pulling of the card shaped medium to perform illegal taking-out of the card shaped medium, the locking pawl is unable to apply a locking force against the pushing force in the reverse direction.

SUMMARY OF THE INVENTION

In view of the problems described above, an object and advantage of the present invention is to provide a card reader in which a card shaped medium inserted from a card insertion port is prevented from being taken out by a user including a malicious person or a criminal.

In order to achieve the above object and advantage, according to an embodiment of the present invention, there is provided a card reader including a card locking device, which prevents a card shaped medium from being pulled out for illegal taking-out. This can be accomplished by preventing and locking the movement of the card shaped medium at an abnormally stopped position when the card shaped medium, that is inserted from a card insertion port formed at the front part of a main body of the card reader, is abnormally stopped. The card locking device includes a lock member that is disposed inside of the main body of the card reader so as to face the card insertion port. One end side of the lock member is turnably supported through a support shaft pin. The lock member is provided with an engaging part that is formed along a periphery of the other end side of the lock member so as to abut with the surface of the card shaped medium. The card locking device includes a movable member, which is connected to the lock member and is reciprocally movable in a direction to the card insertion port. The movable member is operated based on a signal, which detects an abnormal stop of the card shaped medium to turn the lock member in a forward direction around the support shaft pin such that the engaging part abuts with the card shaped medium to lock the card shaped medium.

In accordance with an embodiment of the card reader of the present invention, the engaging part of the lock member of the card locking device abuts with the surface of the card shaped medium, which has been abnormally stopped, to prevent the movement of the card shaped medium from the stopped position and to lock the card shaped medium. Further, since the card locking device includes a movable member, which is connected to the lock member through a support shaft pin and is reciprocally movable in a direction to the card insertion port, the card locking device can be disposed in a free space of the main body housing of an existing card reader with a high degree of freedom so that an increase of size of the card reader can be prevented.

Further, in accordance with an embodiment of the present invention, the card reader is preferably provided with a push-back prevention locking mechanism that includes the movable member and prevents reverse turning of the lock member when the card shaped medium is pushed back in the reverse direction due to fraudulent conduct. When the card shaped medium is pushed back in the reverse direction by fraudulent conduct, the lock member turns in the reverse direction and a locking force to the card shaped medium may be reduced. In order to prevent this problem, in accordance with an embodiment of the present invention, the push-back prevention locking mechanism is actuated to prevent and lock the reverse movement of the movable member.

Further, in accordance with an embodiment of the present invention, a card reader is preferably provided with the push-back prevention locking mechanism including an inclination slot formed in the movable member, which is inclined in a longitudinal direction that is a reciprocating direction of the movable member, and a lock pin, which is engaged with the inclination slot and is movable together with the movable member. The reverse movement of the movable member is prevented by the lock pin, which is engaged with the inclined face of the inclination slot at a lock position. In this example, the lock pin is moved in the inclination slot with the movable member. When the lock pin moves to a predetermined position, the lock pin is pinched by the inclined face of the inclination slot. As described in an embodiment of the present invention, the pinching by the inclined face is performed together with the horizontal slot of a fixed frame that is fixed on the main body housing. As described above, since the push-back prevention locking mechanism is operated, the locking force to the card shaped medium does not vary. Thus the card shaped medium is protected and theft can be prevented.

Further, in accordance with an embodiment of the present invention, the card reader includes a card locking device that prevents a card shaped medium from being pulled out for illegal taking-out by preventing and locking the movement of the card shaped medium at an abnormally stopped position when the card shaped medium inserted from a card insertion port has been abnormally stopped. The card locking device includes a lock member disposed inside of the main body of the card reader so as to face the card insertion port. One end side of the lock member is turnably supported through a support shaft pin, and the lock member is provided with an engaging part that is formed along a periphery of the other end side of the lock member so as to abut with the surface of the card shaped medium. The card locking device includes a motor that operates the card locking device, a gear train that transmits the output of the motor to the card locking device, and a pin clutch mechanism that is provided in the gear train.

In accordance with an embodiment of the present invention, the lock member is provided with an engaging part, which is abutted with the surface of the card shaped medium that has been abnormally stopped, to prevent and lock the card shaped medium from moving from the abnormally stopped position. Thus, a pulling-out resistant force, which is the force enduring a fraudulent conduct when the card shaped medium is pulled out, is improved and reinforced to prevent illegal conduct. In addition, since a pin clutch mechanism is provided in the gear train for transmitting the output of a motor to the lock member, the output of the motor is surely transmitted to the lock member for driving, and the illegal taking-out of the card is effectively prevented. In comparison with the case where the lock member does not move at all at the time of pulling-out, in accordance with an embodiment of the present invention, since the lock member can be slightly moved in the pulling-out direction, the lock member moves together with the card shaped medium slightly, which causes the engaging part to strongly press or bite into the surface of the card shaped medium. In a card reader, in accordance with an embodiment of the present invention, the lock member is capable of moving in the pulling-out direction by the operation of the pin clutch mechanism at the time of illegal taking-out conduct.

In addition, the pin clutch mechanism idles so that rotation is not transmitted to the gear train for a predetermined period at the time of illegal taking-out conduct to permit the engaging part of the lock member to bite into the card shaped medium. On the other hand, when the card shaped medium is further pushed inside of the card reader, the pin clutch mechanism does not idle to restrict the movement of the lock member such that the card shaped medium is not moved inside further more.

In addition, in the card reader in accordance with an embodiment of the present invention, the reduction gear ratio of the gear train is set to be larger such that the lock member is prevented from being turned in the reverse direction in the state that the engaging part abuts with the card shaped medium. According to the construction described above, while the gear train transmits the output of the motor to the lock member, the gear train prevents the lock member from turning in the reverse direction at the time of illegal taking-out of the card shaped medium.

Further, according to an embodiment of the present invention, the card reader includes a card locking device which prevents a card shaped medium from being pulled out for illegal taking-out by preventing and locking the movement of the card shaped medium at an abnormally stopped position when the card shaped medium inserted from a card insertion port formed at the front part of a main body of the card reader has been abnormally stopped. The card locking device includes a lock member which is disposed inside of the main body of the card reader so as to face the card insertion port. One end side of the lock member is turnably supported through a support shaft pin, and the lock member is provided with an engaging part that is formed along the periphery of the other end side of the lock member so as to abut with the surface of the card shaped medium. The engaging part is constructed by a plurality of plate members whose thicknesses are different and laminated in a width direction of the card shaped medium.

In accordance with an embodiment of the card reader of the present invention, the engaging part of the lock member of the card locking device abuts with the surface of the card shaped medium, which has been abnormally stopped, to prevent the movement of the card shaped medium from the stopped position and to lock the card shaped medium. Further, since the engaging part is constructed by a plurality of plate members whose thicknesses are different and is laminated, the abutting width of the lock member with the card shaped medium can be made wider. As a result, the abutting area of the lock member with the card shaped medium can be increased by increasing the thickness of the engaging part in the thickness direction.

In accordance with an embodiment of the present invention, the engaging part of the lock member is preferably formed in a saw-tooth shape which is capable of successively abutting with and biting into the card shaped medium from one end side to the other end side. In this case, since the engaging part of the lock member is formed in a saw-tooth shape, the engaging part is capable of biting into the card shaped medium.

Further, in accordance with an embodiment of the present invention, a plurality of plate members includes a thin plate and a thick plate, and the tip end of the thin plate is preferably protruded from the tip end of the thick plate on the face side of the card shaped medium. According to the construction described above, the thin plate bites into the card shaped medium at the abnormally stopped position, and then the thick plate presses against the surface of the card shaped medium. Therefore, the movement of the card shaped medium is prevented and the pulling-out operation can be prevented.

Further, in accordance with an embodiment of the present invention, the engaging part of the lock member is preferably formed in a shape of cam face so as to successively abut with the card shaped medium from one end side to the other end side to increase contacting pressure. In this case, since the engaging part of the lock member is formed in a cam shape, a contacting pressure to the card shaped medium can be increased by using the cam face whose rotation radius from the support shaft pin becomes gradually larger.

Further, in accordance with an embodiment of the present invention, the engaging part of the lock member may include one-way rolling elements so as to successively abut with the card shaped medium from one end side to the other end side to increase contacting pressure in one direction. In this case, an abutting force with the card shaped medium can be applied in only one direction by using one way rolling elements without applying the abutting force in the reverse direction.

Further, in accordance with an embodiment of the present invention, the engaging part of the lock member may be provided with one pawl shaped part. According to the construction described above, the engaging part is capable of biting into the card shaped medium with a shorter distance in comparison with the case that the engaging part is formed in a saw tooth shape.

Further, in accordance with an embodiment of the present invention, a pair of transporting rollers for transporting the card shaped medium is preferably disposed near the lock member so as to protrude in a feeding path for transporting the card shaped medium. According to the construction described above, the card shaped medium is held between pairs of the transporting rollers so as to be lifted from the face of the feeding path. Therefore, when the pulling-out of the card shaped medium is performed by a criminal after the lock member has been driven, the card shaped medium is moved into the pulling out direction, and the engaging part can bite into the card shaped medium deeply by the lifted amount from the face of the feeding path. Thus, the card shaped medium is locked, and the pulling-out by a criminal can be prevented.

Further, in accordance with an embodiment of the present invention, the engaging part may be preferably disposed at a position where information recording part, such as a magnetic stripe or an integrated circuit chip, of the card shaped medium is passed. The engaging part, disposed at the position described above, is capable of damaging the information recording part at the time of illegal taking-out of the card shaped medium such that reading and writing of information cannot be performed afterwards.

Further, in accordance with an embodiment of the present invention, the plurality of plate members includes thin plates and thick plates, and the thin plates and the thick plates are laminated in a mixed state for the engaging part. When the thin plates and the thick plates are laminated in a mixed state, the tip end part of the thin plate may be especially formed sharply, and thus the pulling-out resistant force can be improved.

Other features and advantages of the invention will be apparent from the following detailed description, taken in conjunction with the accompanying drawings that illustrate, by way of example, various features of embodiments of the invention.

DETAILED DESCRIPTION OF THE PREFERRED EMBODIMENTS

The construction of the present invention will be described below in detail with reference to the accompanying drawings.

Figure 1:
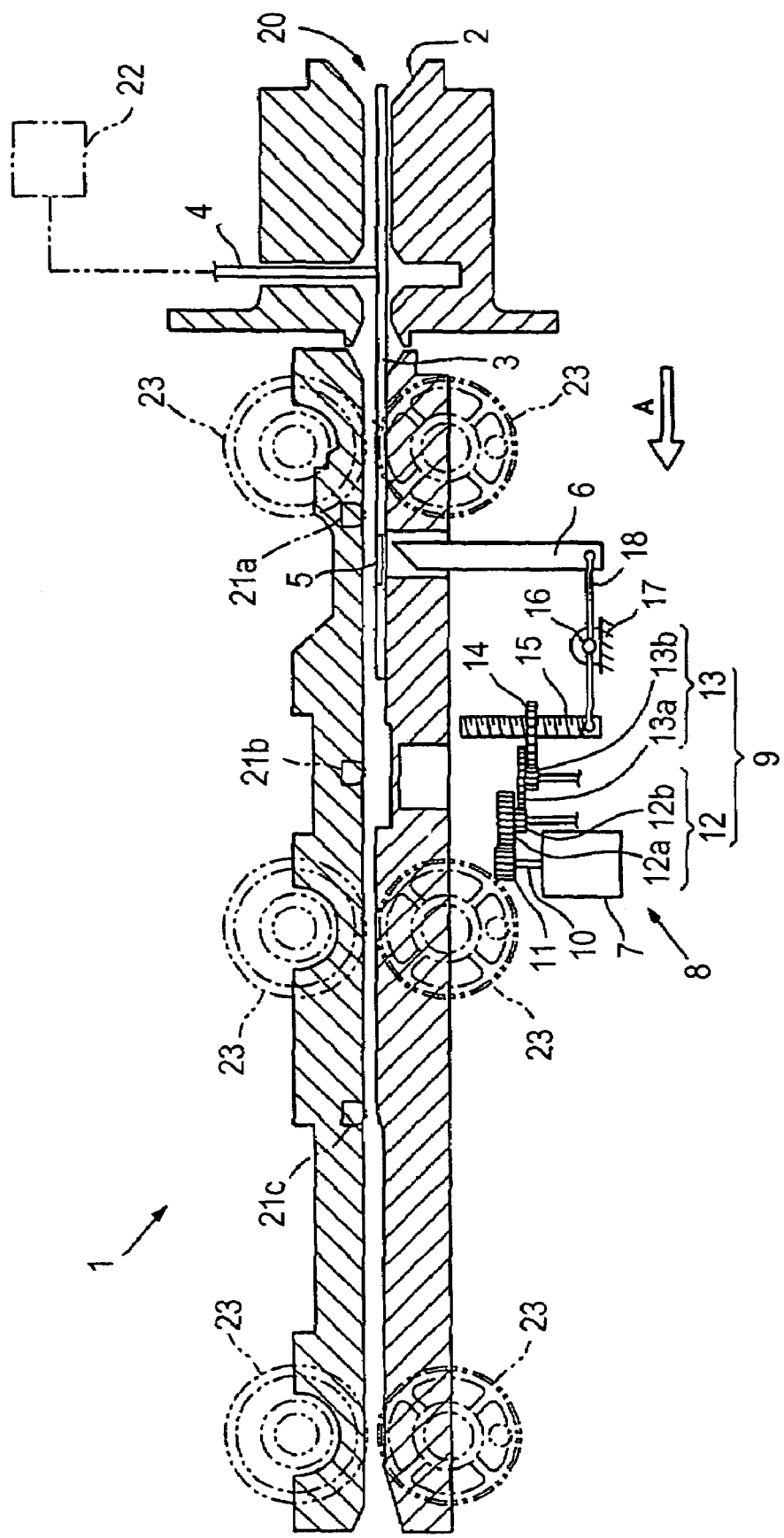
FIG. 1 is a side view showing the outline of card reader of an embodiment of the present invention.
Figure 3:
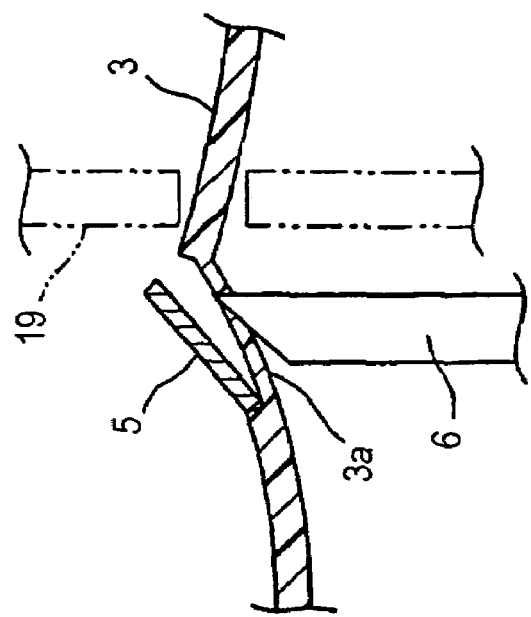
FIG. 3 is an exploded side view showing the state after a needle pushes up an IC chip.
Figure 2:
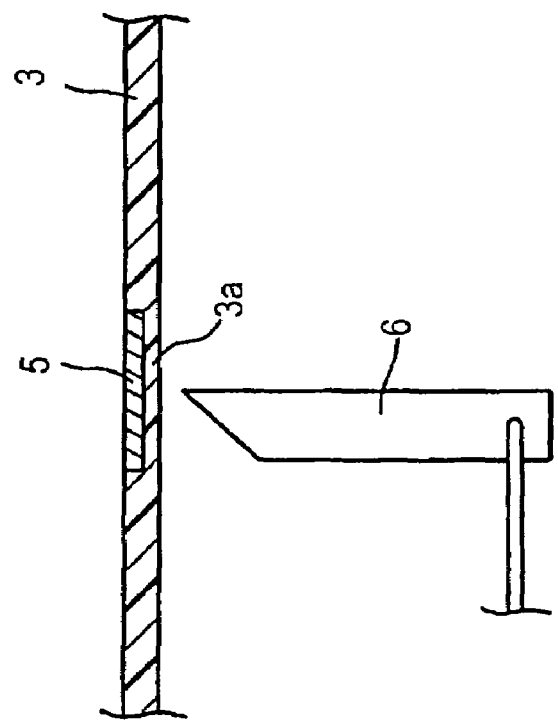
FIG. 2 is an exploded side view showing the state before a needle pushes up an IC chip.

One example of an embodiment of a card reader 1 of the present invention is shown in FIG. 1-3. Card reader 1 conveys IC card 3, which is a card medium provided with IC chip 5, in card path 20 by means of drive roller 23 rotationally driven by a drive motor to perform a predetermined processing. Card reader 1 is provided with needle 6 that can protrude from the rear side of IC chip 5 by piercing card path 20 at the location where IC chip 5 on IC card 3 is being conveyed, and provided with peeling mechanism 8 that has driving device 7 to effect protrusion of needle 6.

When IC card 3 is abnormally stopped in card reader 1, driving device 7 causes needle 6 to protrude and peel IC chip 5 from IC card 3.

Driving device 7 is a motor. Therefore, a damaging force to IC card 3 can be adjusted by adjusting the rotational speed of driving device 7.

That is, the damaging force can be reduced by increasing the rotational speed, or the damaging force can be increased by decreasing the rotational speed.

Needle 6 is positioned near card insertion port 2. The tip of needle 6 has a sharp shape. There are no particular restrictions on material and shape of needle 6. However, in order to peel IC chip 5 away from IC card 3, it is desirable to have a needle of a metallic material having a high hardness and a strength, with sharply pointed tip.

Moreover, needle 6 is attached to the frame of card reader 1 so that it can appear and disappear in the direction perpendicular to the card conveying direction A.

As shown in FIG. 3, thin portion 3a of the IC card 3 embedded with the IC chip 5 can be deformed to peel off the IC chip by pressing or piercing needle 6 into the rear side of IC chip 5.

Alternatively, the pressing or piercing of needle 6 into IC card 3 can prevent IC card 3 from being forcibly pulled out.

Moreover, card reader 1 is provided with shutter 4, capable of opening and closing freely at card insertion port 2, so that IC card 3 can be taken into card reader 1.

Transmission mechanism 9 is provided between driving device 7 and needle 6. Transmission mechanism 9 is equipped with a pinion 11 provided on rotary shaft 10 of the driving device 7, and No. 1 gear 12 having a large toothed wheel 12a engaged with the pinion 11 and small gear 12b; No. 2 gear 13 having large toothed wheel 13a engaged with small gear 12b of No. 1 gear 12 and small gear 13b; No. 3 gear 14 having female screw-type internal teeth and external teeth engaged with small gear 13b of No. 2 gear 13; and movable lead screw 15 engaged with the internal teeth of No. 3 gear 14 and rockable arm 18 which connects lead screw 15 and needle 6 together, has one part fixed on frame 17 via support shaft 16.

By rotation of driving device 7, needle 6 protrudes through pinion 11→No. 1 gear 12→No. 2 gear 13→No. 3 gear 14→movable lead screw 15→rockable arm 18, in that order.

Moreover, card reader 1 is provided with abnormal stop detecting device 21 to detect abnormal stopping of the IC card 3.

Such abnormal stop detecting device 21 may utilize, for example, multiplicity of card detection sensors that detect the presence of IC card 3 in card path 20.

In this practical embodiment, the respective locations include No. 1 card detection sensor 21a located before needle 6; No. 2 card detection sensor 21b located within the length of the IC card 3 as measured from shutter 4, more toward the inside of the card conveyance direction than No 1 card detection sensor 21a, and No. 3 card detection sensor 21c located at a position farther away from shutter 4 than the length of IC card 3, more toward the inside of the card conveyance direction than No. 2 card detection sensor 21b.

With the card detection sensors 21 thus arranged, under normal conditions, the card detection sensors 21a, 21b, 21c sequentially detect IC card 3 as IC card 3 is conveyed. Nevertheless, when No. 1 card detection sensor 21a detects IC card 3 but No. 2 card detection sensor 21b does not detect IC card 3 after a predetermined time elapses from the first detection, or No. 1 and No. 2 card detection sensors 21a, 21b detect the IC card 3 but No. 3 card detection sensor 21c does not detect the IC card 3 after a predetermined time elapses from the first detection, the IC card is considered to have stopped abnormally.

An abnormal stopping of the IC card 3 is thus detected by using card detection sensors 21a, 21b, 21c. Of course, the number and locations of installed card detection sensors 21 are not limited to the above.

Furthermore, detection sensor 22 detecting an open position of the shutter 4 is connected to shutter 4. If shutter 4 is in a closed state, even though an abnormal stopping of IC card 3 is detected, a wrongdoer intending to use IC card 3 fraudulently cannot withdraw IC card 3. However, if the shutter 4 is in an open state, the wrongdoer will be able to pull out IC card 3.

Accordingly, when abnormal stopping of the IC card 3 is detected by the card detection sensors 21 and the shutter 4 is detected to be in an open state by the detection sensor 22, the peeling mechanism 8 is operated to prevent an illegal withdrawal of the IC card 3.

Card reader 1 constituted in the manner described above can prevent IC card 3 as card medium from theft and fraudulent use in the following manner.

If IC card 3 is inserted into the card insertion port 2, shutter 4 is opened, the driving rollers 23 rotate, and IC card 3 is taken into card reader 1. Here, if card detection sensors 21a, 21b, 21c sequentially detect the presence of the card in card path 20, the situation is judged to be normal and peeling mechanism 8 does not operate.

Then the IC card 3 is taken into a predetermined position, shutter 4 is closed, and predetermined processing is performed for IC card 3.

On the other hand, when an abnormal stopping of the IC card 3 is detected by card detection sensors 21 and shutter 4 is also detected to be in an open state by detection sensor 22, peeling mechanism 8 is operated to prevent wrongful withdrawal of IC card 3. In other words, driving device 7 of peeling mechanism 8 is driven, and needle 6 is made to protrude into to the card path 20 via transmission mechanism 9. Then, needle 6 is pushed up from the rear side of IC card 3 to peel the IC chip 5.

Even though the needle 6 does not touch the rear side of the IC chip 5 at this time, because needle 6 contacts IC card 3 at a point more toward card insertion port 2 side than IC chip 5, if an attempt is made to pull out IC card 3, IC chip 5 is peeled off when needle 6 is positioned right in back of IC chip 5.

IC chip 5 that is pushed out, as shown in FIG. 3, is caught by gate 19 provided in the vicinity of card insertion port 2, is reliably peeled off, and left inside the card reader 1.

Accordingly, even if the mount for IC card 3 is pulled out, data will not be used for wrongdoing because IC chip 5 is not pulled out.

Moreover, if IC card 3 is located more toward the inside from the needle 6, IC card 3 cannot be pulled out because needle 6 blocks card path 20.

Accordingly, even if the user of IC card 3 leaves card reader 1 to call a clerk, fraudulet use of IC card 3 by a wrongdoer is prevented because IC chip 5 has been peeled off IC card 3 that is pulled out, or else IC card 3 cannot be pulled out from card reader 1.

Driving device 7 may be rotated in reverse to return the needle 6 from the protrusion position to a retreat position.

Furthermore, the above-mentioned embodiment is one example embodiment of the present invention, but embodiments are not limited to the above, and various modifications are possible as long as there is no deviation from the substance of the present invention.

For example, the tip of needle 6 has a sharp configuration in this embodiment, but the configuration is not limited to this and may be flat.

In this case, IC chip 5 can be peeled off by pushing IC chip 5 from the rear side; at the same time, the damage to IC card 3 can be minimized because IC card 3 is not pierced.

Furthermore, driving device 7 is a motor in the above-mentioned embodiment but is not limited thereto, and may also be a solenoid.

Furthermore, driving device 7 is an exclusive member in the above-mentioned embodiment but is not limited thereto, and other actuators employed in the card reader 1 may also be used in common.

For example, a switch mechanism for abnormal occurrence may be provided, and one of solenoid for IC contacts, solenoid for shutter, conveying motor, etc. may also be used as a drive source.

Then, the needle 6 is positioned near the card insertion port 2 in the above-mentioned embodiment, but it is not limited thereto and may also be positioned on the interior side of card reader 1.

Furthermore, in the above-mentioned practical embodiment, peeling mechanism 8 operates only when abnormal stopping of IC card 3 is detected, but limitations are not imposed thereby. When abnormal stopping of IC card 3 is detected, card detection sensor 21 may be utilized to detect IC card 3 motion other than for regulation, before operating needle 6.

A card reader in accordance with an embodiment of the present invention is shown in FIGS. 4 through 9. The card reader includes a main body 101 of the card reader, and a card insertion port 103, into which a card shaped medium 104 is inserted by a customer formed in the front portion of a main body housing 102. Further, a card locking device 110 is arranged in the main body housing 102. The card locking device 110 is provided with a drive source 105 and power outputted from the drive source 105 is transmitted through a transmission mechanism to set the operation "on" or "off". This card locking device 110 is a device which prevents a card shaped medium 104, which has been abnormally stopped, from being pulled out and stolen by a criminal, i.e., a malicious third party, when a customer departs from the place under the state that a protection shutter (not shown in the drawings) disposed near the card insertion port 103 is opened. The card shaped medium 104, when inserted from the card insertion port 103, is abnormally stopped at the time of failure. Failure can occur in mechanical components or in an electric system of the main body 110 of the card reader, or due to other fraudulent conducts by a criminal, i.e., a malicious third party. In an embodiment of the present invention, a solenoid is used as the drive source 105, which enables a short starting time and a high-speed operation.

The card locking device 110 is provided with the following two locking functions which are essential portions of the present invention in order to prevent illegal theft of the card shaped medium 104. One of the locking functions is an operation of a pull-out prevention locking mechanism which prevents and locks the movement of the card shaped medium 104 at the stopped position against a pulling-out force by a criminal when the criminal forcibly tries to pull out and take the card shaped medium 104. The other locking function is an operation of a push-back prevention locking mechanism which prevents and locks the movement of the card shaped medium 104 at the stopped position against a reverse push-back force by a criminal when the criminal forcibly pushes the card shaped medium 104 in a reverse direction and tries to push in and pull out to take the card shaped medium 104. Both the locking mechanisms will be described below.

Figure 4:
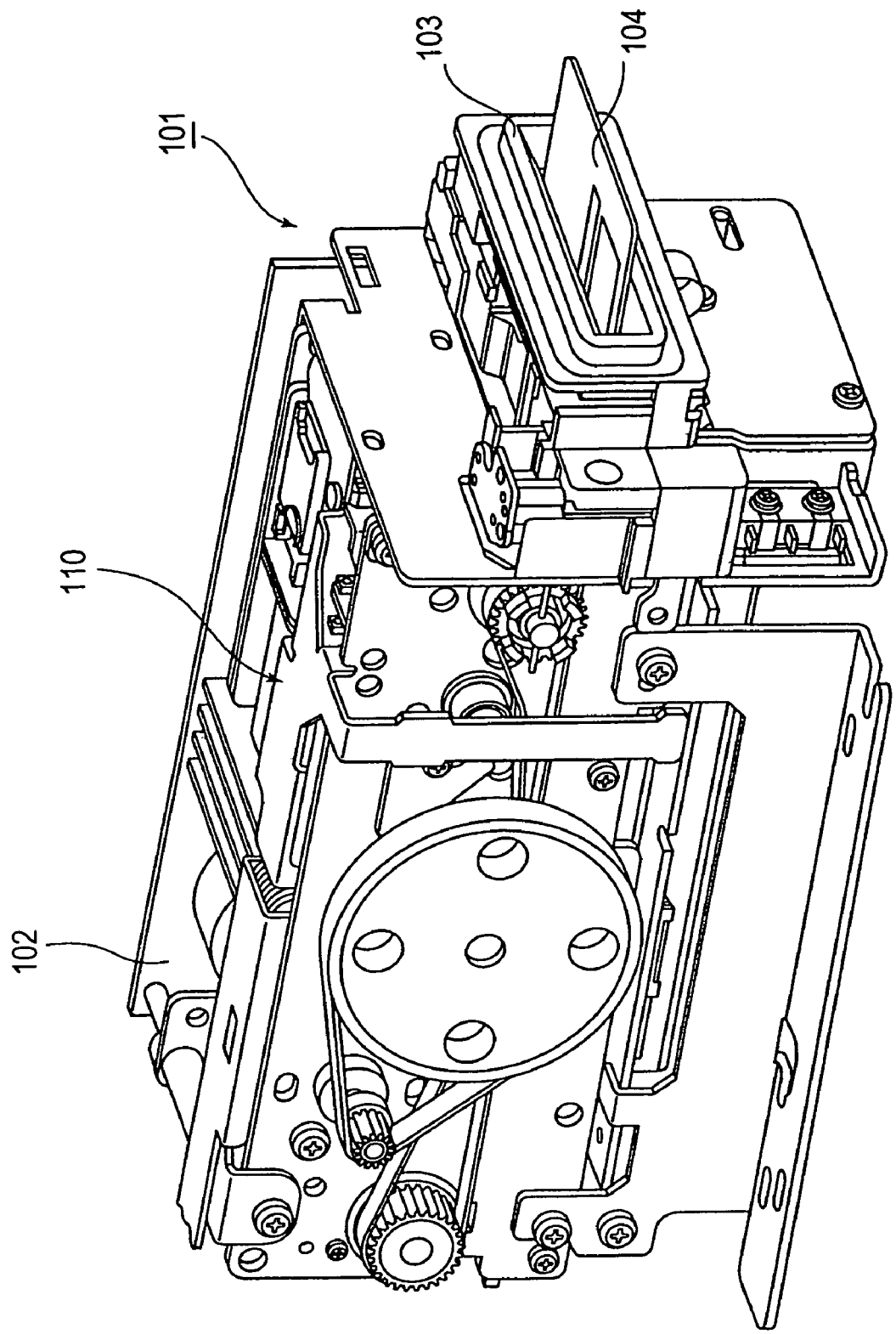
FIG. 4 is a perspective view showing a main body of a card reader in accordance with an embodiment of the present invention.
Figure 5:
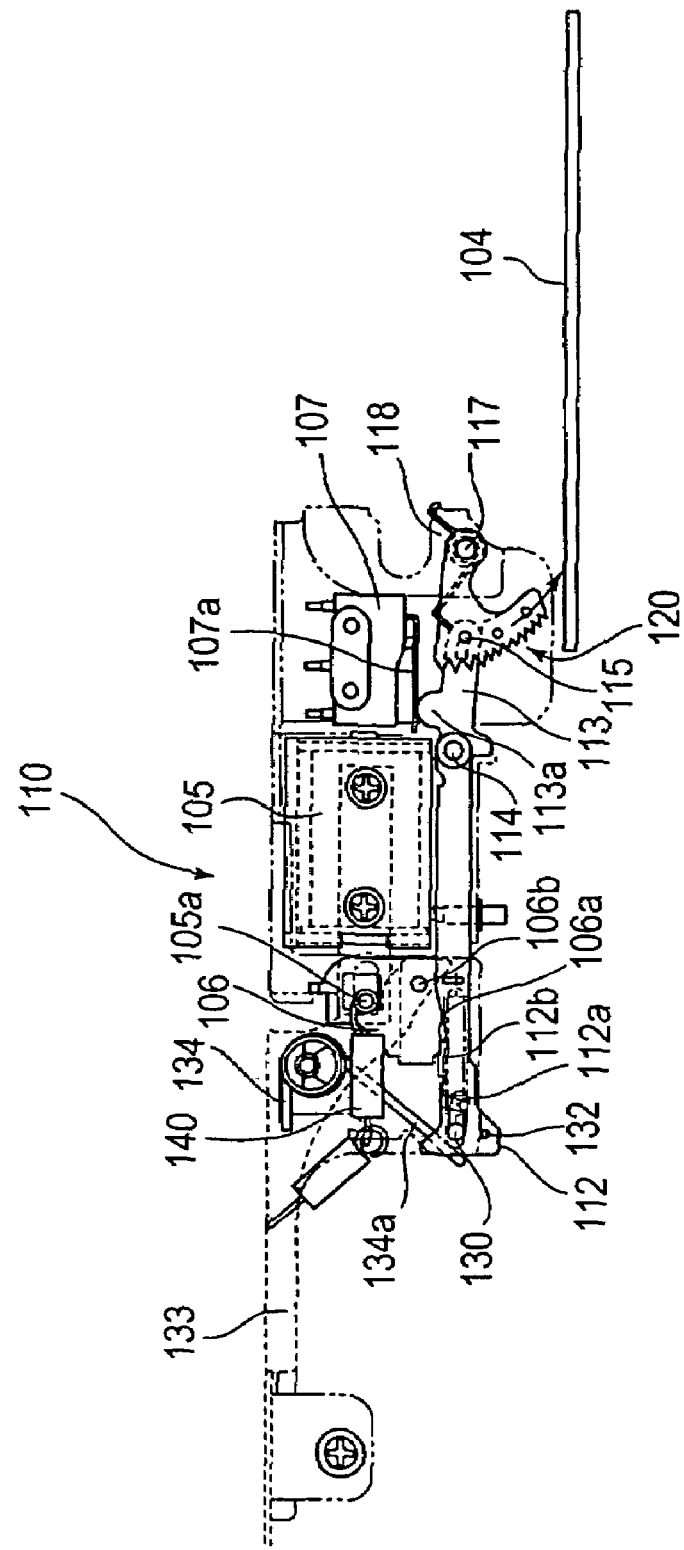
FIG. 5 is a side view showing a pull-out prevention locking mechanism in a card locking device before being activated in accordance with an embodiment of the present invention.
Figure 6:
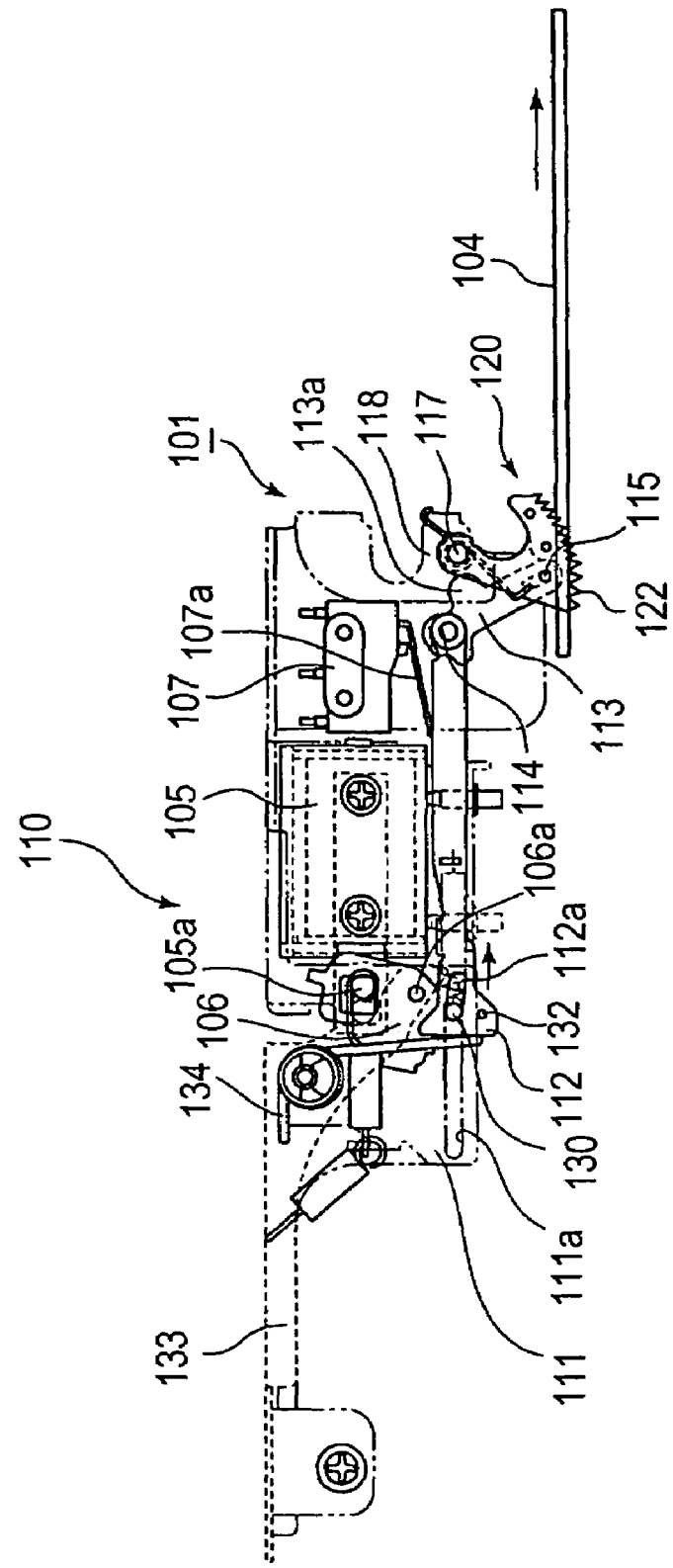
FIG. 6 is a side view showing the pull-out prevention locking mechanism in the card locking device after activation in accordance with the embodiment of the present invention.
Figure 7:
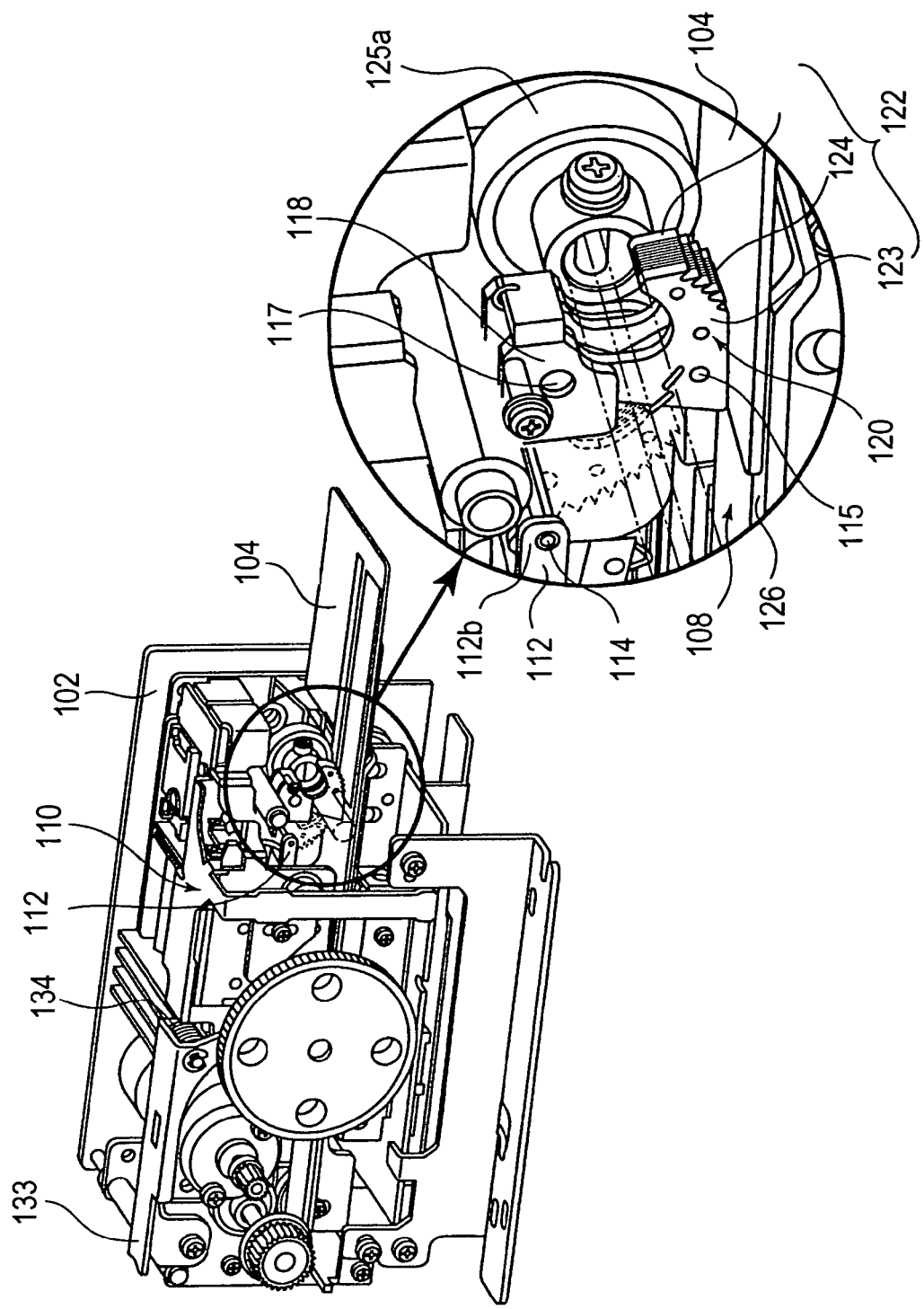
FIG. 7 is a perspective view showing the main body of a card reader and an enlarged perspective view showing a lock lever in the pull-out prevention locking mechanism in accordance with an embodiment of the present invention.

The pull-out prevention locking mechanism includes, as shown in FIGS. 2 through 5, a fixed frame 111, which is fixed in the inside of the main body housing 102, and an elongated movable frame 112, which is guided and slid on the fixed frame 111 so as to be capable of being reciprocated. The movable frame 112 is a movable member in the present invention. The tip end part 112b of the movable frame 112, (as shown in the enlarged view of the circle in FIG. 7, is connected to one end of a conversion lever 113 with a coupling pin 114 and the other end of the conversion lever 113 is turnably connected through a connection pin 115 to a lock lever 120, which is a lock member in the present invention. The movable frame 112 is slid while being guided by the fixed frame 111 from a normal position (return position), shown in FIG. 5, and is capable of moving forward by a prescribed stroke length, as shown in FIG. 6. As described below, the movable frame 112 is urged by an urging spring 131 (FIG. 9) in an advancing direction from the normal position. The movable frame 112 is locked at the normal position against the elastic force of the urging spring 131 by the engagement part 106a of an engaging means 106 which engages with the engagement part 112b of the movable frame 112.

The engaging means 106 is capable of turning around a pin 106b. The pin 105a is fitted to the output shaft of a solenoid as the drive source 105 engages with the engaging means 106, which is moved by the output shaft of the drive source 105. In addition, a spring 140 is provided in the engaging means 106 so as to urge the output shaft of the solenoid. The engaging means 106 is activated by the drive source 105 to release the engagement of the movable frame 112, and thus the movable frame 112 is moved forward by the urging spring 131. Advance or retreat movement of the movable frame 112 is transmitted to the conversion lever 113 as turning movement and converted into the turning movement of the lock lever 120 through the conversion lever 113. This mechanism constructs a link structure.

In accordance with an embodiment of the present invention, the elongated movable frame 112 is provided and the lock lever 120 is turnably disposed on the card insertion port 103 side through the conversion lever 113. Therefore, this mechanism can be disposed in a free space of the main body housing 102 in an existing card reader 101, and thus increase of the size of the card reader 1 is prevented.

The lock lever 120 is a principal member in the pull-out prevention locking mechanism. The entire main lever body 121 of the lock lever 120 is formed like a shape as a ratchet gear as shown in FIGS. 4 and 5. The main lever body 121 is connected to the other end of the conversion lever 113 with a connection pin 115 at the center portion or the tip end side portion of the main lever body 121. The base end portion of the main lever body 121 is turnably pivoted in a bracket 118 which is disposed on the main body housing 102 side through a support shaft pin 117. Therefore, the main lever body 121 is capable of turning forward in a counter-clockwise direction and turning backward in a clockwise direction around the support shaft pin 117 by a turning force from the conversion lever 113. Locking teeth 122 in a saw-tooth shape are formed along the peripheral edge of the tip end part of the main lever body 121 as the engaging part in the present invention. The distance from the locking teeth 122 to the support shaft pin 117 is set to become gradually larger from a locking tooth 122a on one end side to a locking tooth 122b on the other end side. In other words, the turning radius "R" with the support shaft pin 117, as the turning center is set to be formed such that the turning radius "R", becomes gradually larger from the turning radius "R1" at the locking tooth 122a toward the turning radius "R2" at the locking tooth 122b, i.e., "R1"< . . . <"R2".

Further, the main lever body 121 of the lock lever 120 is constructed as a laminated structure comprising a plurality of plate members. The main lever body 121 includes side plates 123 made of a thicker steel plate on both sides in a width direction and a plurality of teeth plates 124, which are laminated between the side plates 123. The plurality of teeth plates 124 are made of thin steel plates, which are formed in a substantially same shape and size. The locking teeth 122 in a saw-tooth shape are formed in each of the teeth plates 124 along its peripheral edge from the locking tooth 122a on one end side to the locking tooth 122b at the other end side. The tooth tips of the locking teeth 122a, 122b are formed in a dimension and shape slightly protruding outside from the locking teeth 122, which are formed on the peripheral edge of the side plate 123. Since the main lever body 121 is formed in an above-mentioned wide laminated structure, the locking teeth 122a, 122b abut with the surface of the card shaped medium 104 widely or at a plurality of points along a card width direction, such as a direction perpendicular to a card traveling direction, and thus the movement of the card shaped medium 104 can be surely prevented and locked.

In this embodiment of the present invention, as shown in the enlarged view in the circle in FIG. 7, the teeth plates 124 are laminated between the side plates 123 on both sides without a gap space. However, several teeth plates 124 are laminated on the side plate 123 side and a spacer may be disposed in a middle portion without the teeth plates 124 laminated in the middle portion.

When the locking teeth 122 are formed by laminating a plurality of teeth plates 124 as described above, there are advantages as follows. In other words, when the teeth plate 124 having a burr formed on its edge is laminated without removing the burr, the locking teeth 122, which are easy to hold or engage with the card shaped medium 104, may be constructed. Normally, the burr is an unnecessary portion but, in the card reader in accordance with an embodiment of the present invention, the locking teeth 122, which are suitable to lock the card shaped medium 104, can be obtained by utilizing the burr. In addition, when the locking teeth 122 are constructed in a laminated structure as described above, the locking teeth 122 with a lot of burrs, which are extremely easy to engage with the card shaped medium 104, can be constructed by laminating a plurality of teeth plates 124 with burrs, and thus the locking teeth 122 become preferable to be utilized in an equipment performing locking of a card.

Transporting rollers 125a, 125b are disposed at positions parallel to the turning face of the lock lever 120 along a card traveling direction. The transporting rollers 125a, 125b are disposed such that respective parts protrude in a card feeding path 108 and the card shaped medium 104 is held between and carried by the upper transporting roller 125a and the lower transporting roller 125b.

Further, a carrying base 126 for defining the card carrying face of the feeding path 108 is disposed on the opposite side of the lock lever 120 with respect to the feeding path 108. When the lock lever 120 is driven, the card shaped medium 104 is held between the carrying base 126 and the locking teeth 122 of the lock lever 120 to prevent the card shaped medium 104 from moving.

Since the lower transporting roller 125b protrudes in the card feeding path 108 from the carrying base 126, the card shaped medium 104 can be carried in the state slightly lifted from the carrying base 126. Therefore, when the pulling of the card is performed by a criminal after the lock lever 120 is driven as described above, the card shaped medium 104 moves in a pulling direction slightly to cause the locking teeth 122 to engage further deeply with the card shaped medium 104 and thus the card shaped medium 104 is furthermore locked and the pull-out operation is prevented.

Figure 9:
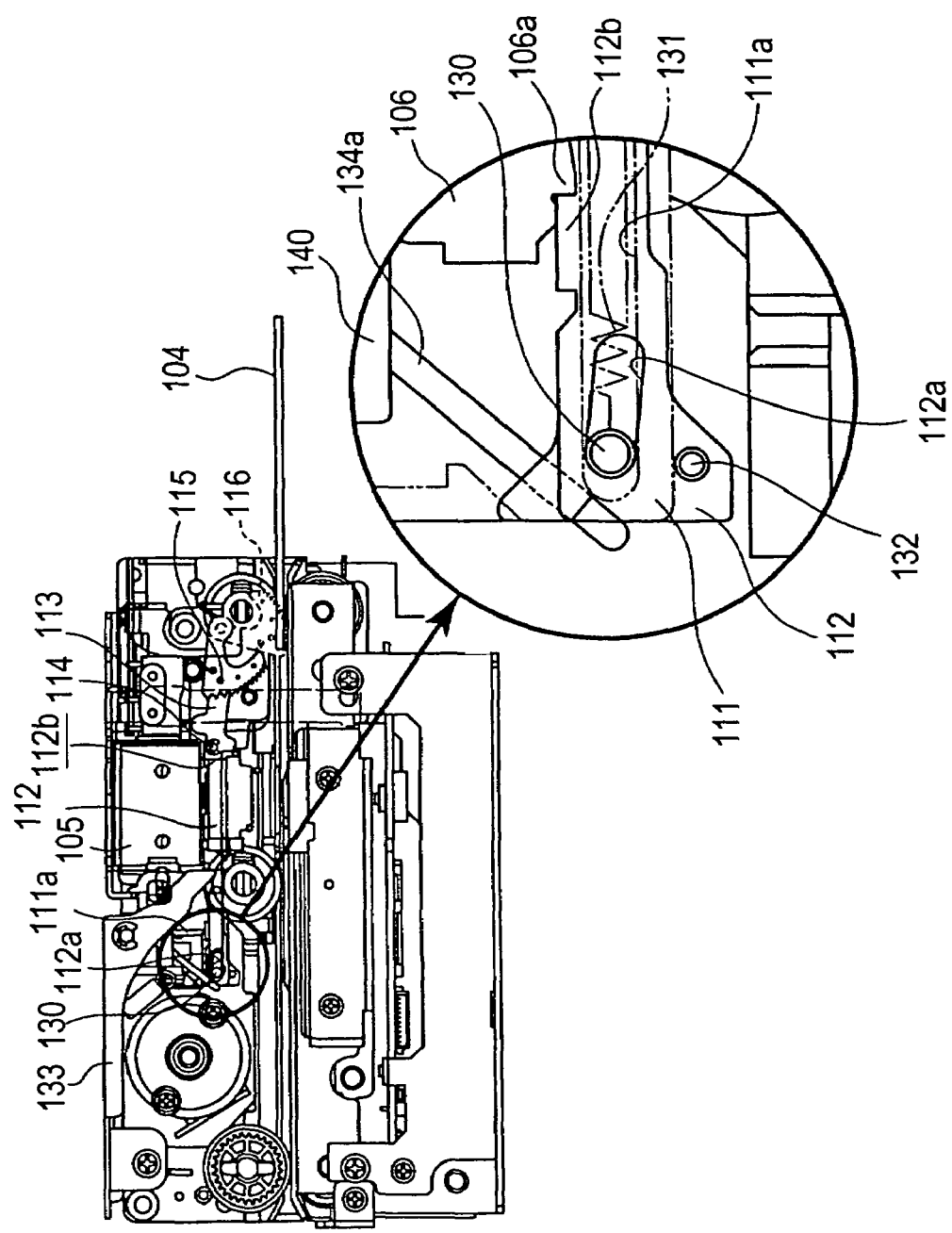
FIG. 9 is a side view showing the main body of a card reader and an enlarged side view showing the essential portion of a push-back prevention locking mechanism in a card locking device in an embodiment of the present invention.

The push-back prevention locking mechanism in the card locking device 110 includes a long hole 111a disposed in the fixed frame 111 so as to extend in a longitudinal direction to the rear end part of the frame and an inclined long hole 112a disposed in the movable frame 112 near the rear end part of the frame so as to incline in the longitudinal direction as shown in the circle in FIG. 9 in which the substantial portion is enlarged. The fixed frame 111 and the movable frame 112 are connected by a lock pin 130, which is penetrated through both the long hole 111a and the inclined long hole 112a. The movable frame 112 slides on the fixed frame 111 in a reciprocated manner, which causes the inclined long hole 112a to move along with the lock pin 130 with respect to the long hole 111a of the fixed frame 111. The Lock pin 130 is connected to the urging spring 131 and thus urged from the normal position toward the card insertion port 103 on the right side in the drawing. In addition, a lock support pin 132 is disposed on the movable frame 112 near its rear end part in an integral manner. This lock support pin 132 abuts with the lower end face in the longitudinal direction of the fixed frame 111 and is guided by the fixed frame 111 to be moved reciprocally with the movable frame 112. Therefore, the movable frame 112 is locked at the normal position by the engaging means 106 against the elastic force of the urging spring 131 and, when the engaging means 106 is activated and the lock is released, the movable frame 112 moves in the rightward direction in the drawing by the urging spring 131.

The push-back prevention locking mechanism includes a lock release lever 133 for releasing the lock pin 130 from the lock position and a spring member 134 mounted around the turnable shaft of the lock release lever 133. In other words, when the lock release lever 133 is turned, the end part 134a of the spring member 134 pushes the lock pin 130 to move from the locking position and the locking state is released.

In FIGS. 2 and 3, the notational symbol "107" is a micro-switch or the like, which transmits a switch signal to the drive source 105. The elastic contact piece 107a of the micro-switch 107, which protrudes outside, is capable of engaging with and disengaging from a convex-shaped contact part 113a formed in the conversion lever 113. In other words, when the drive source 105 is activated on the basis of the signal, which detects an abnormal stop of the card shaped medium 104, and the locking of the movable frame 112 in the card locking device 110 is released to move the movable frame 112 forward from the normal position, the conversion lever 113 turns and its convex-shaped contact part 113a disengages from the elastic contact piece 107a to make the micro-switch 107 turn "on" or "off".

The operation of the card reader will be described below.

When the card shaped medium 104 is inserted from the card insertion port 103, it is judged whether the card shaped medium 104 is a prescribed card or not based on a detection signal from a monitoring sensor. When it is judged the card shaped medium 104 is a prescribed card, a protection shutter is opened and the card shaped medium 104 is inserted into the main body 101 of the card reader. After the protection shutter is opened and, when the card shaped medium 104 is further inserted inside, the card shaped medium 104 is carried by the transporting rollers to a reading position or the like and reading processing or writing processing are performed.

Immediately after a customer inserts the card shaped medium 104, it may be happened that the card shaped medium 104 is abnormally stopped near the card insertion port 103 due to a failure occurred in the internal mechanism or the electric system of the main body 101 of the card reader. Alternatively, a criminal applies an illegal work to perform a fraudulent conduct such that the card shaped medium 104 that a customer has inserted is intentionally stopped in the state where the protection shutter is opened. When the customer who does not know the situation correctly departs from the place to call the person in charge or the like, the criminal may take out the card shaped medium 104 to steal it.

When a monitoring means, such as a medium detect sensor, detects the abnormal stop of the card shaped medium 104 when the protection shutter is opened, an activating signal is sent to the drive source 105 on the basis of the detection signal and the engaging means 106 is activated to release the locking of the movable frame 112 at the normal position. In other words, the output shaft of the solenoid as the drive source 105 is drawn in (moving on the card insertion port 103 side) and the engaging means 106 turns around the pin 106b along with the pin 105a mounted to the output shaft, and thus the engagement part 106a of the engaging means 106 moves apart from the engagement part 112b of the movable frame 112. The movable frame 112, which is released, moves forward toward the card insertion port 103 by the urging spring 131 to turn the conversion lever 113, which is connected at the tip end part of the movable frame 112. As a result, the lock lever 120 is turned in the forward and counterclockwise direction around the support shaft pin 117 through the conversion lever 113. The lock lever 120, which is turned in the forward and counterclockwise direction, makes the locking teeth 122 of the main lever body 121 be brought into contact with the surface of the card shaped medium 104, which has been abnormally stopped.

When the customer departs from the place to inform the abnormal stoppage of the card shaped medium 104 and, at that time, a criminal tries to pull out the card shaped medium 104 to steal it, the pull-out prevention locking mechanism of the card locking device 110 is activated.

The lock lever 120 abutting with the surface of the card shaped medium 104 is going to be turned in the counterclockwise direction around the support shaft pin 117 with a pull-out force "P" by the criminal and the locking teeth 122 is operated so as to bite into the card face. When the criminal increases the pull-out force "P" more and more, the locking teeth 122 turns gradually and moves from the locking tooth 122a with the turning radius "R1" toward the locking tooth 122b with the larger turning radius "R2". Therefore, the force by the locking teeth 122 to bite into the surface of the card shaped medium 104 increases according to the increase of the turning radius "R" of the locking teeth 122. In other words, the movement preventing force (locking force) in the direction that the pull-out force "P" is acted on by the lock lever 120 to the card shaped medium 104 is increased by a one-way mechanism and thus the card shaped medium 104 is locked and held at the stopped position.

In this embodiment of the present invention in which thin steel plates are used, the biting of the locking teeth 122 to the card face is performed such that the locking teeth made of a plurality of the teeth plates 124 bite into the surface of the card shaped medium 104 and the peripheral faces of the side plates 123 made of a thick steel plate on both sides press against the surface of the card shaped medium 104. Since the main lever body 121 is constructed in a laminated structure and made wider by using the side plates 123 and the teeth plates 124, as described above, the main lever body 121 abuts with the surface of the card shaped medium 104 like face contact or at a plurality of points widely in a card width direction, and thus the movement of the card shaped medium 104 is surely prevented and locked. Therefore, ah illegal theft of the card shaped medium 104 by the criminal can be prevented.

On the other hand, the criminal thinks that the card shaped medium 104 cannot be taken out only by pulling-out motion due to the operation of the pull-out prevention locking mechanism of the card lock device 120, and then the criminal may try to push back the card shaped medium 104 inside and repeat pulling and pushing to obstinately take out the card shaped medium 104. In this case, the push-back prevention locking mechanism of the card lock device 120 is activated.

When the criminal tries to push back the card shaped medium 104 to the inside of the device in the reverse direction, the lock lever 120 functioning in one way direction turns slightly in the reverse and clockwise direction by the pushing back force and the locking force. The locking teeth 122 is reduced to allow the card shaped medium 104 to move in the card carrying direction, i.e., the left side direction in the drawing. However, the movement of the card shaped medium 104 is also prevented. In other words, the pushing back force of the criminal is transmitted from the lock lever 120 to the conversion lever 113, and the movable frame 112 is moved backward, i.e., in the left side direction in the drawing, against the urging spring 131 through the conversion lever 113.

When the movable frame 112 is retreated, the lock pin 130 in the inclined long hole 112a is also moved in the left side direction in an integral manner. The movement of the lock pin 130 is guided by the long hole 111a of the fixed frame 111. After that, the lock pin 130 reaches to a position where the slant face of the inclined long hole 112a of the movable frame 112 crosses the horizontal face of the long hole 111a of the fixed frame 111. The lock pin 130 is sandwiched by the slant face, and the horizontal face at the crossing part and a strong pressure is applied to the lock pin 130. Therefore, a further movement of the lock pin 130 is prevented and a locking state is attained. In this state, the lock support pin 132 moving along with the movable frame 112 is guided by abutting with the longitudinal lower end face of the fixed frame 111 and thus prevents the lifting of the movable frame 112 by the force due to its slant face. As a result, since the lifting preventive force for the movable frame 112 is also applied to the lock pin 130, the lock pin 130 is firmly locked by the three-point support of the horizontal face of the long hole 111a, the slant face of the inclined long hole 112, and the abutting face of the lock support pin 132. Thus, the locking state to the lock pin 130 is surely obtained.

When the lock pin 130 is locked as described above, the movement in the pushing back direction of the movable frame 112 is prevented and the reverse turning of the lock lever 120 is stopped. Therefore, the locking force to the card shaped medium 104 does not vary. Thus, even when the criminal repeatedly pulls and pushes to obstinately try to take out the card shaped medium 104, the card shaped medium 104 is protected and the theft of the card shaped medium 104 is prevented.

As described above, the movement of the card shaped medium 104 is prevented because the card shaped medium 104 is sandwiched between the carrying base 126 and the locking teeth 122 of the lock lever 120 during the activation of the pull-out prevention locking mechanism and the push-back prevention locking mechanism of the card locking device 110. Therefore, the pull-out prevention locking mechanism and the push-back prevention locking mechanism are useful to cancel the forces of pulling-out and pushing back of the card by the criminal. Therefore, when the pulling-out of a card shaped medium 104 is performed by a criminal after the lock lever 120 has been driven, the card shaped medium 104 is moved in the pulling-out direction slightly and the locking teeth 122 bite into the card shaped medium 104 further deeply by a lifted amount. Thus, the card shaped medium 104 is locked and the pulling-out is prevented.

Figure 10:
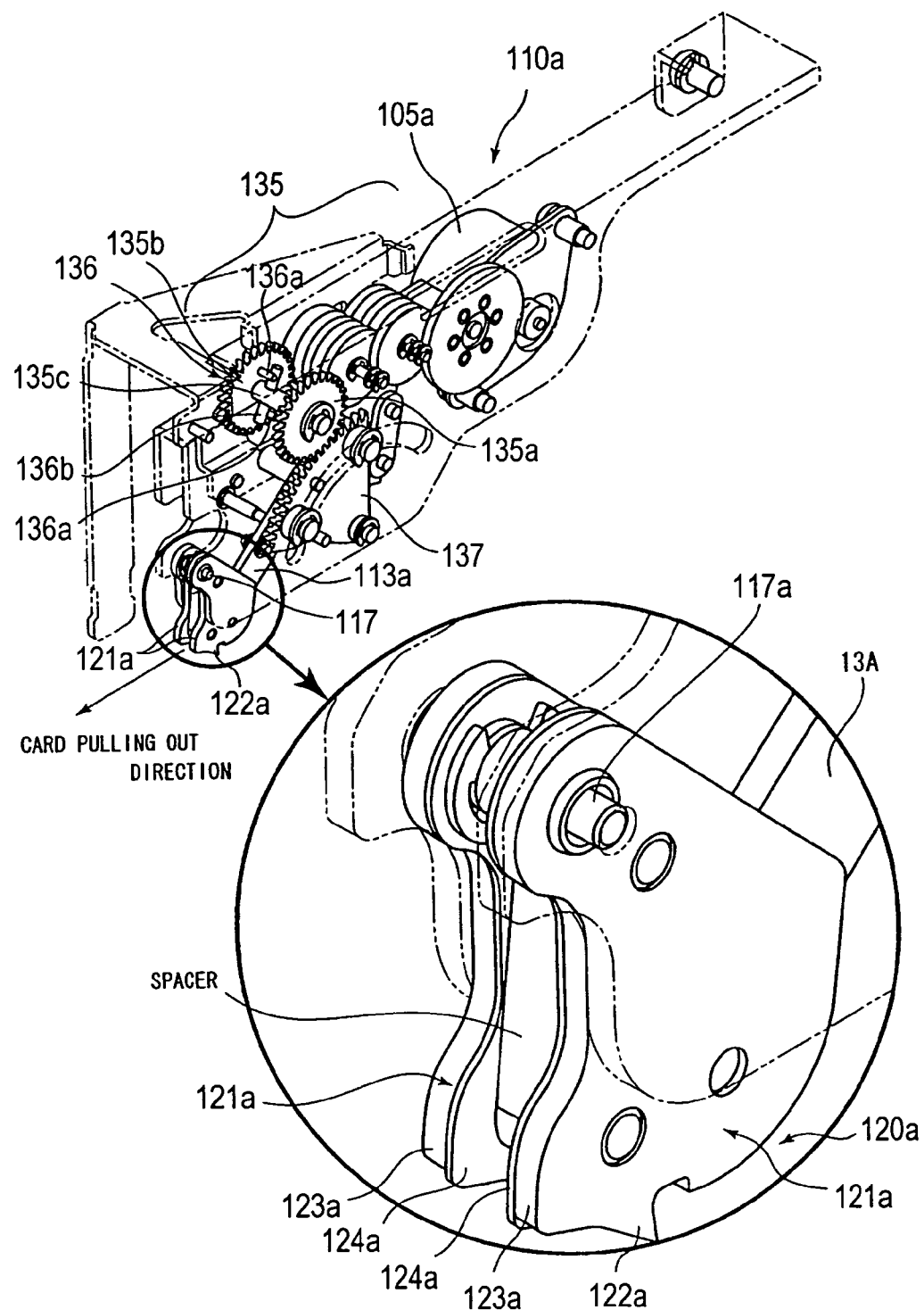
FIG. 10 is a perspective view showing a card locking device in accordance with another embodiment of the present invention.
Figure 11:
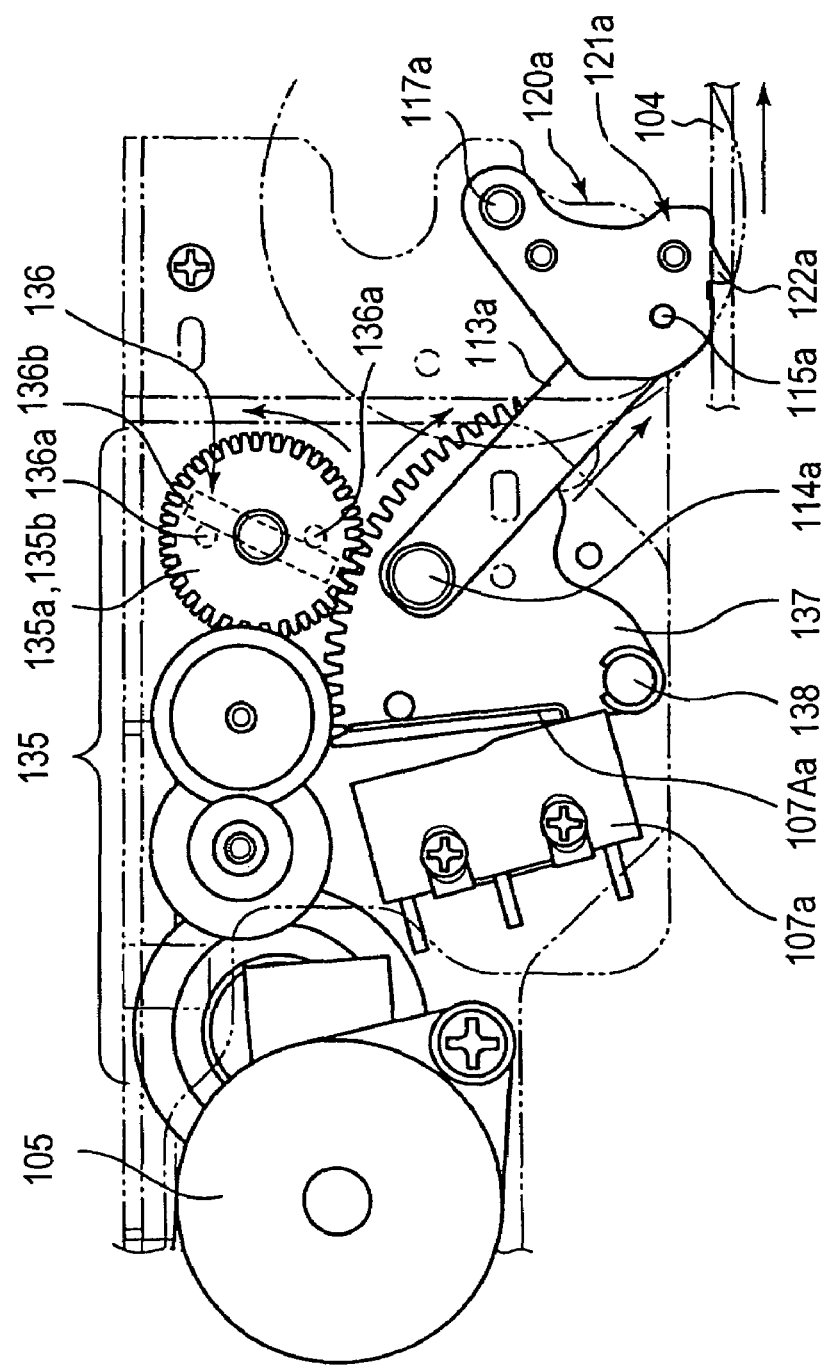
FIG. 11 is an explanatory side view showing operation of the card locking device shown in FIG. 10.
Figure 12:
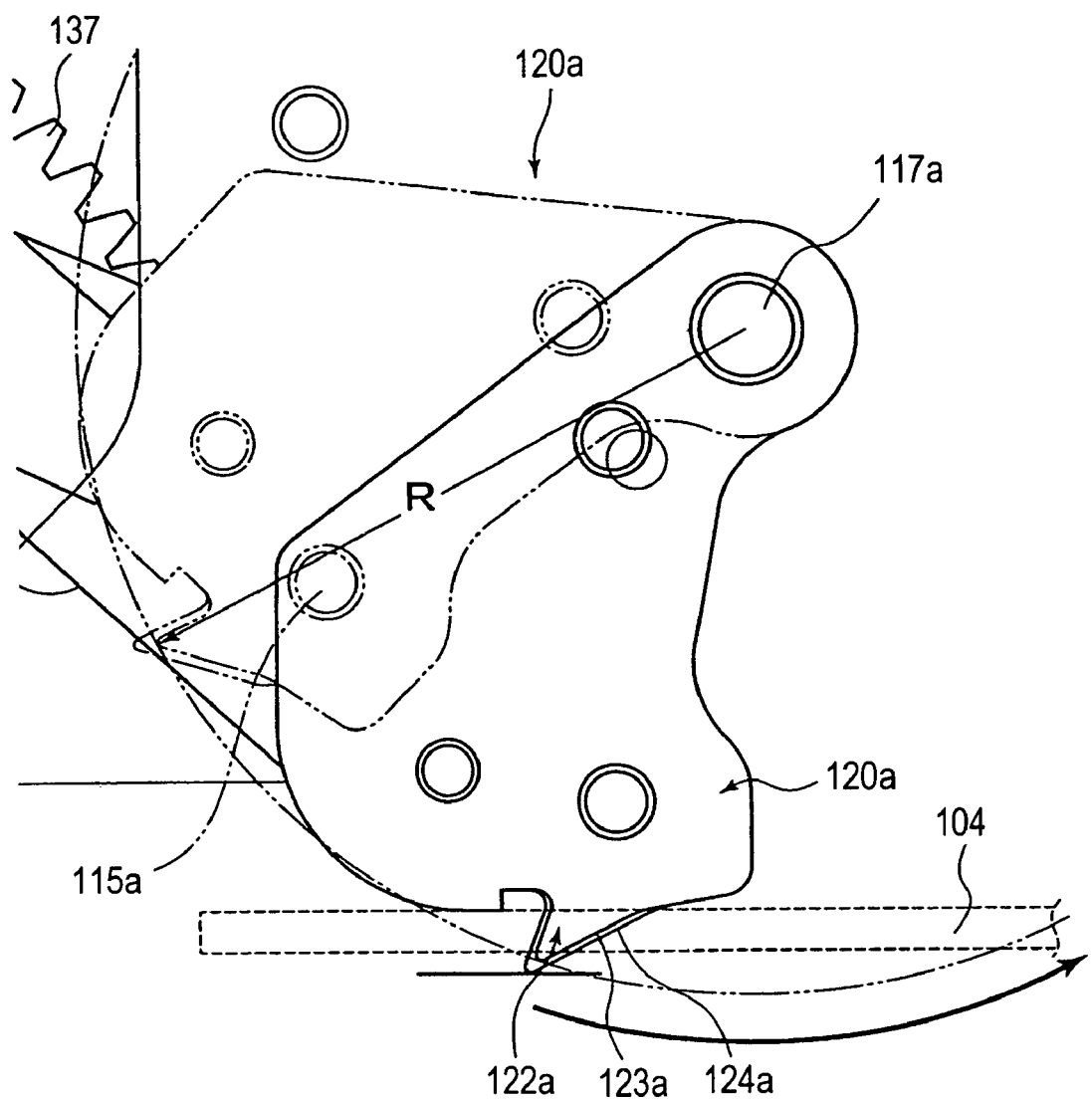
FIG. 12 is an enlarged view showing operation of a locking tooth in the card locking device shown in FIG. 10.
Figure 13:
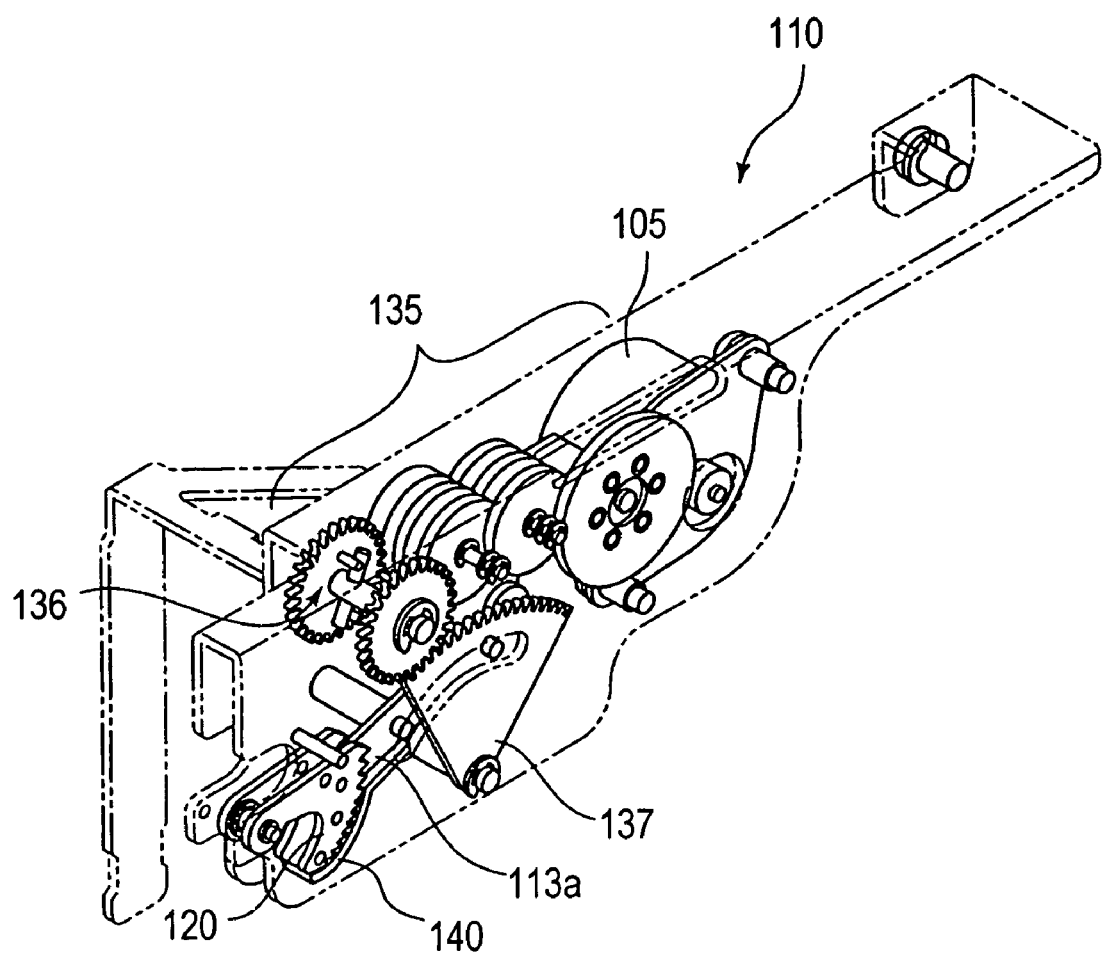
FIG. 13 is a perspective view showing a card locking device in accordance with another embodiment of the present invention.
Figure 14:
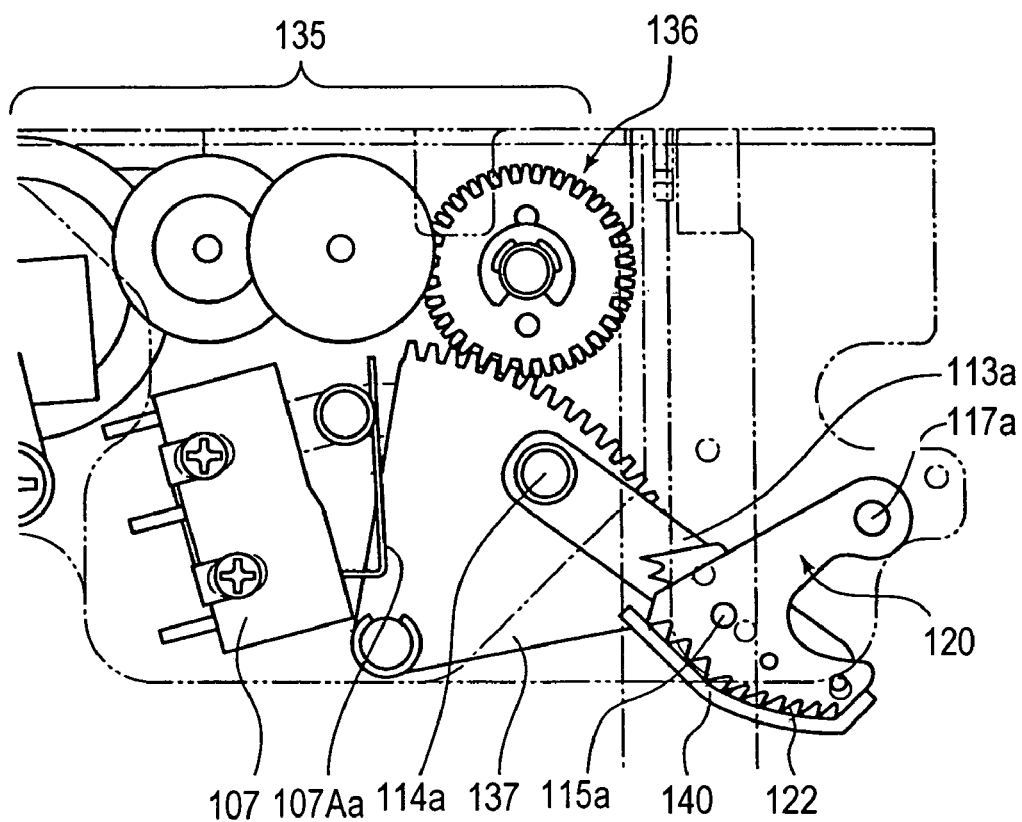
FIG. 14 is an enlarged view showing operation of locking teeth in the card locking device shown in FIG. 13.

Next, a card lock device in accordance with another embodiment of the present invention will be described below with reference to FIGS. 7 through 9. FIG. 10 is a perspective view showing a card locking device. FIG. 11 is an explanatory view showing operation of the card locking device. FIG. 12 is an explanatory enlarged view showing operation of locking teeth. A card reader provided with the card locking device is constructed in the same structure as the card reader described above, and thus its description is omitted.

Figure 8:
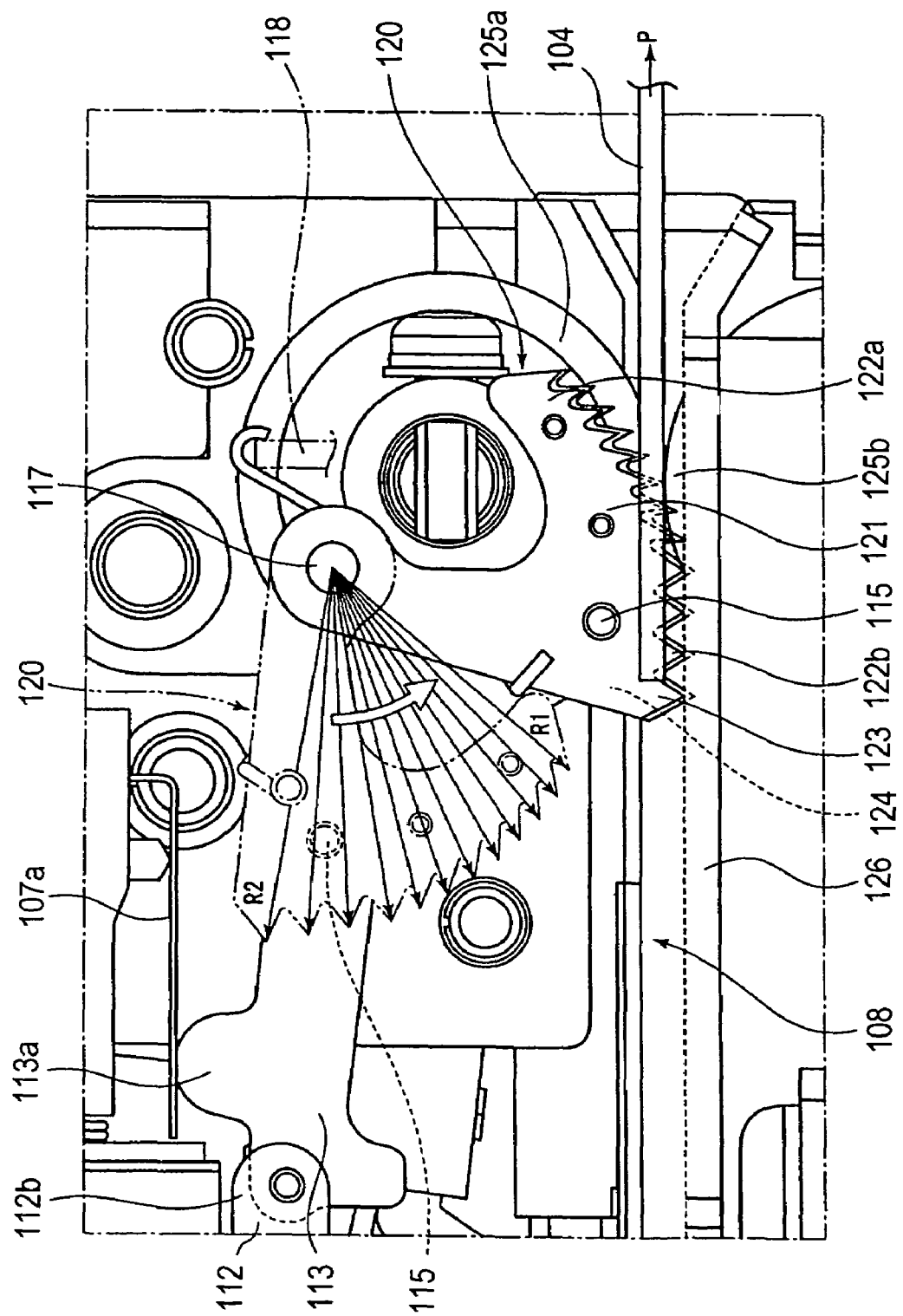
FIG. 8 is a side view showing a lock lever in accordance with an embodiment of the present invention.

A card locking device 110A in accordance with another embodiment of the present invention is provided with a motor as a drive source 105A to operate the main body of the card reader as shown in FIGS. 7 and 8. The card locking device 110A whose operation is turned "on" or "off" by means of that the power outputted from the drive source 105A is transmitted through a transmission mechanism is disposed in a main body housing.

The card locking device 110A includes a deceleration gear train 135 transmitting the driving force of the drive source (motor) 105A, a pin clutch mechanism 136 disposed in the gear train 135, a fan-shaped gear 137 connected to the final gear of the gear train 135, a connection lever (conversion lever) 113A connecting the fan-shaped gear 137 with a lock lever 120A, and the lock lever 120A provided with locking teeth.

The gear train 135 is connected to the motor 105A and the driving force of the motor 105A is transmitted to the gear train 135 and decelerated. In addition, in accordance with this embodiment of the present invention, as shown in FIGS. 7 and 8, the final gear of the gear train 135 is constructed of a gear 135a that is fixed to a driving shaft 135c and a gear 135b rotatably supported on the driving shaft 135c.

Further, in this embodiment of the present invention, it is preferable that the reduction gear ratio of the gear train 135 to the fan-shaped gear 137 through the final gears 135a, 135b is set to be a magnitude capable of preventing a turning of the lock lever 120A in a reverse direction. In this case, even when the card shaped medium 104 is pushed in the reverse direction (inside direction of the main body 101 of the card reader), the card shaped medium 104 can be prevented from being moved inside because the fan-shaped gear 137, the connection lever 113A and the lock lever 120A are locked so as not to move.

In addition, two protruded parts 136a, which are protruded in parallel with the drive shaft 135c, are formed on the side face of the gear 135b at intervals of 180°. A pin 136b protruding in the radial direction is formed on the drive shaft 135c. Two protruded parts 136a are disposed within the turning range of the pin 136b. Thus, the pin 136b and the protruded parts 136a can be engaged and disengaged. The pin clutch mechanism 136 is constructed by using the pin 136b and the protruded parts 136a as described above. In other words, when the final gear 135b is rotated by the drive source 105a, the final gear 135a idles until the protruded parts 136a engage with the pin 136b. When the protruded parts 136a engage with the pin 136b, the final gear 135a fixed to the drive shaft 135c is rotated together with the final gear 135b.

Since the fan-shaped gear 137 is engaged with the gear 135a, the fan-shaped gear 137 is turned around the support shaft 138 as shown in FIG. 11. One end of the connection lever (conversion lever) 113A is connected to the end part side of the fan-shaped gear 137 with a connecting pin 114A, and the other end of the connection lever (conversion lever) 113A is turnably connected through a connection pin 115A with the lock lever 120A that is the lock member in the present invention.

Further, a micro-switch 107A for transmitting a switch signal to the drive source 105A is disposed near the fan-shaped gear 138. As shown in FIG. 11, the connecting pin 114A provided on the end part side of the fan-shaped gear 137 is capable of being engaged with/disengaged from an elastic contact piece 107Aa that is protruded outside from the micro switch 107A. In other words, the drive source 105A is operated on the basis of a signal which detects the abnormal stop of the card shaped medium 104, and the engagement of the card locking device 110A is released to turn the fan-shaped gear 137 from a normal position and the connecting pin 114A is disengaged from the elastic contact piece 107Aa. As a result, the micro-switch 107A is turned "on" or "off".

The lock lever 120A is a principal member in the pull-out prevention locking mechanism. The entire main lever body 121A is formed in a shape, such as a ratchet gear as shown in FIGS. 8 and 9. The main lever body 121A is connected to the other end of the connection lever 113A with a connecting pin 115A at its central part or near its tip end part. The base end part of the main lever body 121A is turnably supported by a support shaft pin 117A. Therefore, the main lever body 121A is capable of turning in a forward and counterclockwise direction around the support shaft pin 117A or turning in a reverse and clockwise direction by a turning force from the connection lever 113A.

The main lever body 121A is constructed as a laminated structure comprising of a plurality of plate members. The main lever body 121A includes two side plates 123A made of a thicker steel plate on both sides in a width direction and, for example, two tooth plates 124A, which are laminated between the side plates 123A. Two tooth plates 124A are made of thin steel plates, which are formed in a substantially same shape and size. Concretely, as shown in the enlarged view in the circle in FIG. 10, one piece of the tooth plate 124A is abutted with the inner face of the respective side plates 123A, and a spacer is disposed between one tooth plate 124A and the other tooth plate 124A. The number of the tooth plates 124A is not limited to two. A plurality of tooth plates 124 may be provided without a gap space like the above-mentioned locking teeth 122.

Since the main lever body 121A is formed in an above-mentioned wide laminated structure, a plurality of locking teeth 122A of the side plates 123A and the tooth plates 124A abut with the surface of the card shaped medium 104 widely or at a plurality of points along a card width direction (direction perpendicular to a card traveling direction). Thus, the movement of the card shaped medium 104 can be surely prevented and locked.

When the main lever body 121A is formed in a laminated structure in the width direction as described above, the points or the area where a plurality of locking teeth 122A engages or bites the card shaped medium 104 are increased in the card width direction, which is perpendicular to the traveling direction of the card shaped medium 104. Therefore, even when a strong pulling-out force is applied at the time of taking-out of the card, the pulling-out resistant force can be improved and reinforced to prevent the illegal conduct.

In this embodiment of the present invention, the main lever body 121A may be constructed such that the tooth plates 124A and the thick side plates 123A are laminated in a mixed state. When the tooth plates 124A and the side plates 123A are laminated in a mixed state as described above, the locking tooth 122A is preferably constructed, which is further easy to engage with the surface of the card shaped medium 104.

It may be possible that the locking tooth 122A is constructed only by laminating the tooth plates 124A. However, in this case, the number of component parts, and time and labor for working are increased and furthermore, sagging or the like may occur due to the insufficiency of strength in the tooth plate 124A. On the contrary, when the side plates 123 are disposed on both ends in the width direction, the locking tooth 122A is constructed, which is easy to engage with the surface of the card shaped medium 104 and the number of component parts and time and labor are not increased.

The locking tooth 122A, as an engaging part, is formed on the periphery of each tip end part of the side plate 123A and the tooth plate 124A. The locking tooth 122A is formed of one sharp pawl-shaped projection. In addition, the outer periphery of the main lever body 121A and the tip end of the locking tooth 122A is formed in a substantially same diameter as shown in FIG. 12. In other words, the distance from the locking tooth 122A to the support shaft pin 117A is set to be the same as the turning radius "R" whose turning center is the support shaft pin 117A.

Further, the locking tooth 122A is preferably movable in the range that the locking tooth 122A is capable of turning enough to cross the feeding path 108 for the card shaped medium 104. In this case, the part formed in the pawl shape of the locking tooth 122A can be bitten into the card shaped medium 104 in addition to that the locking tooth 122A are merely abutted or contacted on the surface of the card shaped medium 104.

More concretely, for example, similarly to the above-mentioned embodiment of the present invention, the card shaped medium 104 is held between the upper transporting roller and the lower transporting roller near the lock lever 120A and is capable of being transported in the state where the card shaped medium 104 is slightly lifted from the carrying base 126. Therefore, it is constructed that the locking tooth 122A is capable of turning in the range enough to bite into the card shaped medium 104. Accordingly, at the time of illegal taking-out of the card, the locking tooth 122A can be bitten or penetrated into the card shaped medium 104. Thus, the pulling-out resistant force, which endures the pulling out of the card shaped medium 104, can be improved and reinforced.

Further, in this embodiment of the present invention, the tooth tip of the locking tooth 122A, which is formed on the peripheral edge of the tooth plate 124A, is formed in a dimension and shape slightly protruding outside from the locking tooth 122A, which is formed on the peripheral edge of the side plate 123A.

Further, when the locking tooth 122A is formed by laminating a plurality of teeth plates 124A, as described above, there are advantages as follows. When the tooth plate 124A having a burr formed on its edge is laminated without removing the burr, the locking tooth 122A, which is easy to hold or engage with the card shaped medium 104, may be constructed. Normally, the burr is an unnecessary portion but, in the card reader in accordance with an embodiment of the present invention, the locking tooth 122A suitable to lock the card shaped medium 104 can be obtained by utilizing the burr. In addition, when the locking tooth 122A is constructed in a laminated structure, as described above, the locking tooth 122A with a lot of burrs which are extremely easy to engage with the card shaped medium 104 can be constructed by laminating a plurality of tooth plates 124A with burrs. Thus, the locking tooth 12-2A becomes preferable to be utilized in an equipment performing locking of a card.

Further, the respective pieces of the locking tooth 122A, which are formed on the peripheral portion of the lock lever 120A, as described above, are disposed on the path on which a portion such as a magnetic stripe or an IC chip of the card shaped medium 104 where information is recorded (information recording part) is traveled. In the card reader in accordance with this embodiment of the present invention, at the time of illegal taking-out of the card, the information recording part of the card shaped medium 104 can be damaged to the extent that the reuse of the card is impossible. Accordingly, even if the card shaped medium 104 is illegally taken out by conducting extremely skillful action, illegal reuse of the card shaped medium 104 can be prevented.

The operation of the card lock device described above will be described below. Since the card reader provided with this card locking device is similar to the card reader described above, the operation will be described below by using the same notational symbols but not shown.

Not shown in the drawing, when the card shaped medium 104 is inserted from the card insertion port 103, it is judged whether the card shaped medium 104 is a prescribed card or not on the basis of a detection signal from a monitoring sensor. When it is judged the card shaped medium 104 is a prescribed card, a protection shutter is opened, and the card shaped medium 104 is capable of being inserted into the main body 101 of the card reader. After the protection shutter is opened and, when the card shaped medium 104 is further inserted inside, the card shaped medium 104 is carried by the transporting rollers, for example, 125a, 125b, to a reading position or the like and reading processing or writing processing are performed.

Immediately after a customer inserts the card shaped medium 104, the card shaped medium 104 may be abnormally stopped near the card insertion port 103 due to a failure occurred in the internal mechanism or the electric system of the main body 101 of the card reader. Alternatively, a criminal may apply an illegal work to perform a fraudulent conduct, such that the card shaped medium 104 that a customer has inserted is intentionally stopped in the state where the protection shutter is opened. When the customer, who does not know correctly the situation, departs from the place to call the person in charge or the like, the criminal may take out the card shaped medium 104 to steal it.

When a monitoring means, such as a medium detect sensor, detects the abnormal stop of the card shaped medium 104 when the protection shutter is opened, an activating signal is transmitted to the motor as the drive source 105A based on the detection signal and the drive source (motor) 105A is rotated in a prescribed direction. This rotation is transmitted to the gear train 135. When the final gear 135b is rotated by the drive source 105A, the final gear 135a idles until the protruded parts 136a engage with the pin 136b. When the protruded parts 136a engage with the pin 136b, the final gear 135a fixed to the drive shaft 135c is integrally rotated.

In this manner, the final gears 135a, 135b of the gear train 135 are decelerated and rotated to turn the fan-shaped gear 137. The connection lever 113A pivotably supported on the side face of the fan-shaped gear 137 is moved by the turning of the fan-shaped gear 137. Therefore, the lock lever 120A is turned in a forward and counterclockwise direction around the support shaft pin 117A through the connection lever 113A. As a result, the lock lever 120A turned in the forward and counterclockwise direction causes the locking tooth 122A of the lever main body 121A to be abutted on or bitten into the surface of the card shaped medium 104, which is abnormally stopped.

When the customer departs from the place to inform the abnormal stoppage of the card shaped medium 104 and, at the time, a criminal tries to pull out the card shaped medium 104 to steal it, the pull-out prevention locking mechanism of the card locking device 110A is activated.

The lock lever 120A abutting with the surface of the card shaped medium 104 turns in the counterclockwise direction around the support shaft pin 117A with a pull-out force "P" by the criminal, and the locking tooth 122A of the tooth plate 124A is operated so as to bite into the card face. In other words, the moving preventing force (locking force) of the lock lever 120A to the card shaped medium 104 in the direction of the pulling-out force "P" is increased, and the biting of the locking tooth 122A into the card shaped medium 104 is increased by a one-way clutch method by utilizing the pin clutch mechanism 136. Thus, the card shaped medium 104 is locked and held at the abnormally stopped position.

Next, when a criminal pushes the card shaped medium 104 in the push-back direction, the pin clutch mechanism 136 of the card locking device 110A is operated. As shown in FIG. 11, when the card shaped medium 104, which is bitten by the locking tooth 122A, is pushed back into the main body 101 of the card reader, the lock lever 120A and the connection lever 113A move in the left direction in the drawing and the fan-shaped gear 137 turns in the clockwise direction. The final gear 135a and the drive shaft 135c begin to rotate. The pin 136b fitted to the drive shaft 135c is separated from the abutted protruded part 136a and begins to rotate freely and abuts with another protruded part 136a which is separated with 180°.

In this free rotating area, since the lock lever 120A does not bear the load of the drive source (motor) 105A and the gear train 135, the lock lever 120A can be turned by the pushing-back force. Thus, one piece of pawl constructing the locking tooth 122A bites into the card shaped medium 104. After the pin 136b abuts with the above-mentioned another protruded part 136a, the pushing-back force is going to rotate the drive source 105A and the gear train 135. However, since the detent torque of the drive source 105A and the gear train 135 is large, the pushing back of the card shaped medium 104 is difficult. In this manner, the card shaped medium 104 can not be taken out from the locking tooth 122A even if the criminal pulls and pushes the card shaped medium 104.

According to the card locking device 110A in another embodiment of the present invention as described above, a lock lever 120A provided with the locking tooth 122A having one piece of pawl on its periphery at approximately equal distance from the center is used without using an eccentric cam. Therefore, the locking tooth 122A with one piece of pawl can be bitten into the card shaped medium 104 in a shorter distance in comparison with using the locking teeth 122, which is formed in a saw teeth shape in the pulling-out operation of the card shaped medium 104.

In addition, since a motor is used for the drive source 105A and the pin clutch mechanism 136 is provided in the structure in which the lock lever 120A is turned through the gear train 135, the locking tooth 122A can be operated so as to be further bitten into the card shaped medium 104 also in the pushing-back operation. Therefore, the card shaped medium 104 is difficult to be taken out in the pulling-out and pushing-back operations and the illegal taking-out of the card shaped medium 104 can be surely prevented.

The present invention has been described in detail using the embodiments, but the present invention is not limited to the embodiments described above and many modifications can be made without departing from the present invention.

For example, in any of the embodiments described above, the locking teeth 122 (122A) provided in the lock lever 120 (120A) are directly abutted with bitten into the card shaped medium 104 to prevent the card shaped medium 104 from being illegally taken out. Alternatively, it may be constructed that a cover is provided so as to cover the locking teeth 122 (122A) in advance and the locking teeth 122 (122A) with the cover is pressed against the card shaped medium 104 to prevent fraudulent conduct. As shown in FIGS. 10 and 11, a portion of the locking teeth 122 (122A), which is at least capable of coming into contact with the surface of the card shaped medium 104, is covered with a protection member 140 to make the protection member 140 abut with the surface of the card shaped medium 104. In this example, a fraudulent conduct can be prevented while the surface of the card shaped medium 104 is prevented from being damaged. Thus, the card shaped medium 104 after having prevented the fraudulent conduct can be used afterwards. In order to effectively prevent the pulling-out or pushing-back of the card shaped medium 104, it is preferable that the protection member 140 is made of an elastic member with a high frictional coefficient to some extent, such as rubber.

Further, instead of using the locking teeth 122 in a saw-tooth shape provided in the lock lever 120, which is effective to increase a biting force in a one-way direction, lock bearings or the like which are rolling elements in a one-way method and fitted with a proper pitch along the periphery of the main lever body 121 may be utilized as the engaging part in the present invention. Further, it may be constructed that a ratchet pawl turning one way is provided so as to turn around the support shaft pin 117, which pivotably supports the main lever body 121 to completely prevent the reverse rotation of the main lever body 121 in the clockwise direction. In addition, it may be constructed that the entire lock lever 120 is formed in a cam shape having a cam face whose turning radius "R" from the support shaft pin 117 is set to be gradually larger. According to this construction, its locking force is increased because the surface of the card shaped medium is pressed by the cam face. Thus, theft by a fraudulent conduct is prevented.

While the description above refers to particular embodiments of the present invention, it will be understood that many modifications may be made without departing from the spirit thereof. The accompanying claims are intended to cover such modifications as would fall within the scope and spirit of the present invention.

The presently disclosed embodiments are, therefore, to be considered in all respects as illustrative and not restrictive. The scope of the invention is indicated by the appended claims rather than the foregoing description. All changes which come within the meaning and range of equivalency of the claims are, therefore, intended to be embraced therein.

What is claimed is:

1. A card reader comprising:
   a card locking device that prevents a card shaped medium from being pulled out for illegal taking-out by preventing and locking movement of the card shaped medium at an abnormally stopped position when the card shaped medium, after being inserted from a card insertion port formed at a front part of a main body of the card reader, has been abnormally stopped,
   wherein the card locking device comprises:
   a lock member disposed inside of the main body of the card reader so as to face the card insertion port, one end side of the lock member being turnably supported through a support shaft pin, and the lock member being provided with an engaging part, which is formed along a periphery of the other end side of the lock member so as to abut with a surface of the card shaped medium, and
   a movable member connected to the lock member and is reciprocally movable in a direction to the card insertion port, the movable member being operated based on a signal, which detects an abnormal stop of the card shaped medium to turn the lock member around the support shaft pin, such that the engaging part abuts with the card shaped medium to lock the card shaped medium.

2. The card reader according to claim 1, further comprising a push-back prevention locking mechanism, which includes the movable member and prevents reverse turning of the lock member when the card shaped medium is pushed back in a reverse direction due to a fraudulent conduct.

3. The card reader according to claim 1, wherein the push-back prevention locking mechanism further comprises:
   an inclination slot provided in the movable member, which is inclined in a longitudinal direction that is a reciprocating direction of the movable member; and
   a lock pin engaged with the inclination slot and is movable together with the movable member,
   wherein a reverse movement of the movable member is prevented by the lock pin, which is engaged with an inclined face of the inclination slot at a lock position.

4. A card reader comprising:
   a card locking device, which prevents a card shaped medium from being pulled out for illegal taking-out by preventing and locking movement of the card shaped medium at an abnormally stopped position when the card shaped medium inserted from a card insertion port has been abnormally stopped,
   wherein the card locking device comprises:
   a lock member disposed inside of a main body of the card reader so as to face the card insertion port, one end side of the lock member being turnably supported through a support shaft pin, and the lock member being provided with an engaging part, which is formed along a periphery of the other end side of the lock member, so as to abut with a surface of the card shaped medium;
   a motor for operating the card locking device;
   a gear train transmits an output of the motor to the card locking device; and
   a pin clutch mechanism provided in the gear train.

5. The card reader according to claim 4, wherein a reduction gear ratio of the gear train is set to be larger, such that the lock member is prevented to be turned in a reverse direction in the state that the engaging part abuts with the card shaped medium.

6. A card reader comprising:
   a card locking device that prevents a card shaped medium from pulling out for illegal taking-out by preventing and locking movement of the card shaped medium at an abnormally stopped position when the card shaped medium inserted from a card insertion port formed at a front part of a main body of the card reader has been abnormally stopped,
   wherein the card locking device comprises:
   a lock member disposed inside of the main body of the card reader so as to face the card insertion port, one end side of the lock member being turnably supported through a support shaft pin, and the lock member being provided with an engaging part which is formed along a periphery of the other end side of the lock member so as to abut with a surface of the card shaped medium,
   wherein the engaging part is constructed by a plurality of plate members, with different thicknesses, laminated in a width direction of the card shaped medium.

7. The card reader according to claim 6, wherein the engaging part of the lock member is formed in a saw-tooth shape capable of successively abutting with and biting into the card shaped medium from one end side to the other end side.

8. The card reader according to claim 6, wherein the plurality of plate members includes a thin plate and a thick plate, and a tip end of the thin plate is protruded from a tip end of the thick plate on a face side of the card shaped medium.

9. The card reader according to claim 6, wherein the engaging part of the lock member is formed in a shape of cam face so as to successively abut with the card shaped medium from one end side to the other end side to increase contacting pressure.

10. The card reader according to claim 6, wherein the engaging part of the lock member includes one-way rolling elements so as to successively abut with the card shaped medium from one end side to the other end side to increase contacting pressure in one direction.

11. The card reader according to claim 6, wherein the engaging part of the lock member is provided with one pawl shaped part.

12. The card reader according to claim 6, further comprising a pair of transporting rollers for transporting the card shaped medium, which is disposed near the lock member so as to protrude in a feeding path for transporting the card shaped medium.

13. The card reader according to claim 6, wherein the engaging part is disposed at a position where information recording part, including a magnetic stripe or an integrated circuit chip of the card shaped medium, is passed.

14. The card reader according to claim 6, wherein the plurality of plate members includes thin plates and thick plates, wherein the thin plates and the thick plates are laminated in a mixed state for the engaging part.

* * * * *